United States Patent
Sawai et al.

(10) Patent No.: US 9,007,938 B2
(45) Date of Patent: Apr. 14, 2015

(54) USER EQUIPMENT, BASE STATION, COMMUNICATION CONTROL METHOD, AND RADIO COMMUNICATION SYSTEM

(75) Inventors: Ryo Sawai, Tokyo (JP); Hiroaki Takano, Tokyo (JP)

(73) Assignee: Sony Corporation, Tokyo (JP)

( * ) Notice: Subject to any disclaimer, the term of this patent is extended or adjusted under 35 U.S.C. 154(b) by 76 days.

(21) Appl. No.: 13/508,382

(22) PCT Filed: Nov. 9, 2010

(86) PCT No.: PCT/JP2010/006561
§ 371 (c)(1),
(2), (4) Date: May 7, 2012

(87) PCT Pub. No.: WO2011/061903
PCT Pub. Date: May 26, 2011

(65) Prior Publication Data
US 2012/0230217 A1 Sep. 13, 2012

(30) Foreign Application Priority Data

Nov. 18, 2009 (JP) ................................ 2009-263004
Sep. 29, 2010 (JP) ................................ 2010-219635

(51) Int. Cl.
*H04L 5/00* (2006.01)
*H04W 52/02* (2009.01)
(Continued)

(52) U.S. Cl.
CPC ............... *H04W 24/08* (2013.01); *H04L 5/001* (2013.01); *H04L 5/006* (2013.01); *H04L 5/0094* (2013.01);
(Continued)

(58) Field of Classification Search
USPC .......................... 370/230, 278, 311, 329, 336
See application file for complete search history.

(56) References Cited

U.S. PATENT DOCUMENTS

2010/0227569 A1* 9/2010 Bala et al. ........................ 455/73
2010/0278143 A1 11/2010 Chun et al.
(Continued)

FOREIGN PATENT DOCUMENTS

| JP | 2008 172355 | 7/2008 |
|---|---|---|
| JP | 2009 232293 | 10/2009 |
| WO | 2008 023927 | 2/2008 |

OTHER PUBLICATIONS

3GPP TR 36.912, V9.0.0, "$3^{rd}$ Generation Partnership Project; Technical Specification Group Radio Access Network; Feasibility study for Further Advancements for E-UTRA (LTE-Advanced)," Total 17 pages, (Sep. 2009).

(Continued)

*Primary Examiner* — Andrew Chriss
*Assistant Examiner* — John Lequang
(74) *Attorney, Agent, or Firm* — Oblon, McClelland, Maier & Neustadt, L.L.P.

(57) ABSTRACT

User equipment performs radio communication with a base station over a communication channel formed by aggregating a plurality of component carriers. The user equipment measures a channel quality of the communication channel, and creates a measurement report using a result of the measurement and sends the measurement report to the base station. Each data signal is classified into two or more classes depending on a QoS requirement. The user equipment further receives control information related to a mapping between the plurality of component carriers and the class of each data signal from the base station, and controls at least one of the measurement and the sending of the measurement report, according to a procedure which varies depending on the control information. A base station allocates data to component carriers based on channel quality criteria for different data classifications.

15 Claims, 15 Drawing Sheets

(51) Int. Cl.
*H04W 72/04* (2009.01)
*H04W 24/08* (2009.01)
*H04W 72/08* (2009.01)
*H04W 28/02* (2009.01)
*H04W 36/30* (2009.01)

(52) U.S. Cl.
CPC .......... *H04W 36/30* (2013.01); *H04W 72/0453* (2013.01); *H04W 72/085* (2013.01); *H04W 28/0268* (2013.01)

(56) References Cited

U.S. PATENT DOCUMENTS

| | | | | |
|---|---|---|---|---|
| 2010/0296389 | A1* | 11/2010 | Khandekar et al. | 370/216 |
| 2010/0296473 | A1* | 11/2010 | Kim et al. | 370/329 |
| 2010/0303011 | A1* | 12/2010 | Pan et al. | 370/328 |
| 2010/0303039 | A1* | 12/2010 | Zhang et al. | 370/331 |
| 2011/0034175 | A1* | 2/2011 | Fong et al. | 455/450 |
| 2011/0044261 | A1* | 2/2011 | Cai et al. | 370/329 |
| 2011/0105173 | A1* | 5/2011 | Haim et al. | 455/522 |
| 2011/0134868 | A1* | 6/2011 | Lee et al. | 370/329 |
| 2011/0142009 | A1* | 6/2011 | Lindoff et al. | 370/332 |
| 2011/0176477 | A1* | 7/2011 | Lee et al. | 370/315 |
| 2013/0100835 | A1* | 4/2013 | Teng et al. | 370/252 |

OTHER PUBLICATIONS

3GPP TSG RAN WG1#53bis, R1-082448, "Carrier aggregation in Advanced E-UTRA," Huawei, Total 4 pages, (Jun. 30-Jul. 4, 2008).
International Search Report Issued Feb. 8, 2011 in PCT/JP10/06561 Filed Nov. 9, 2010.
Combined Chinese Office Action and Search Report issued Mar. 7, 2014 in Patent Application No. 201080051019.9 with English Translation.

* cited by examiner

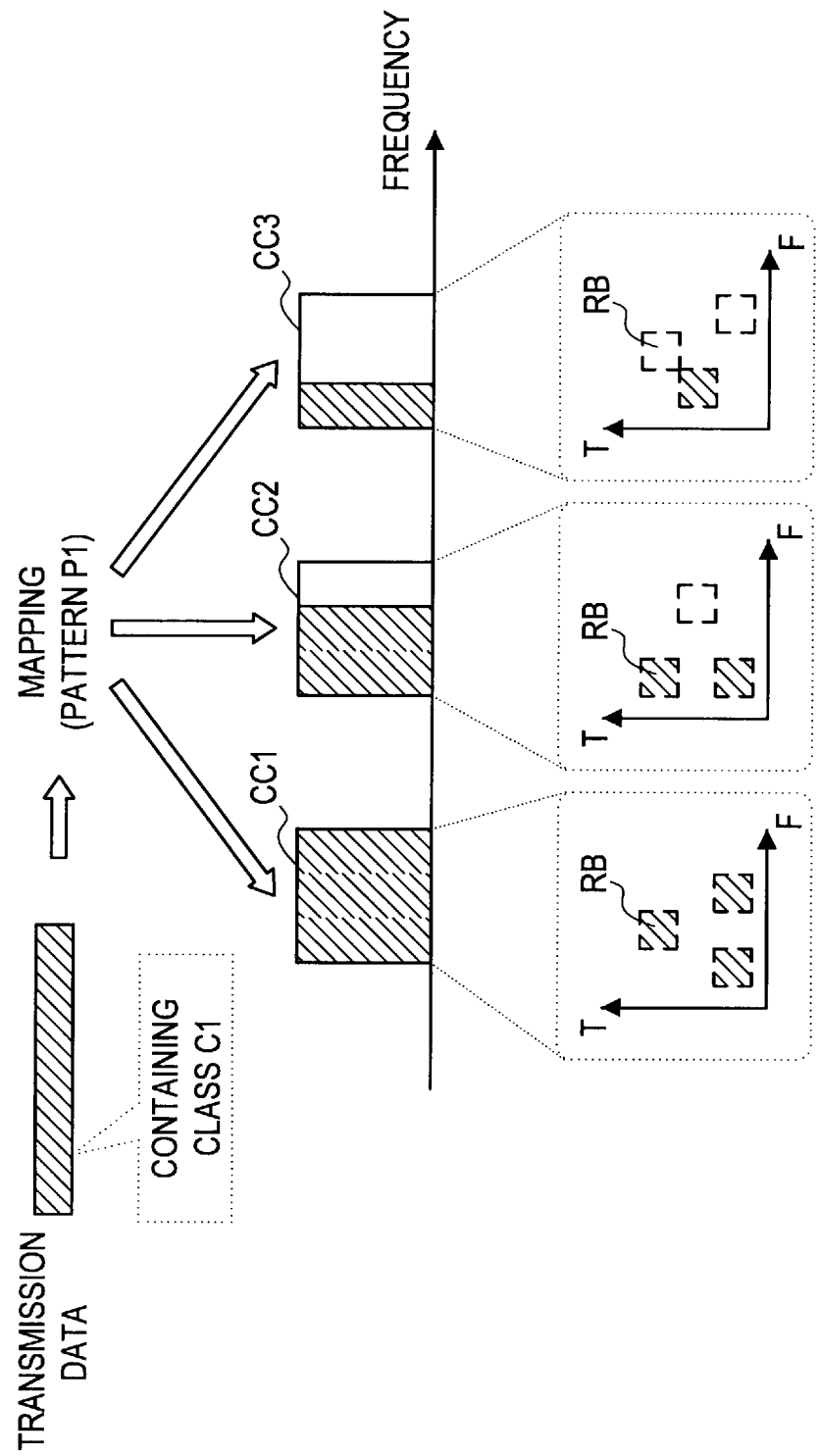

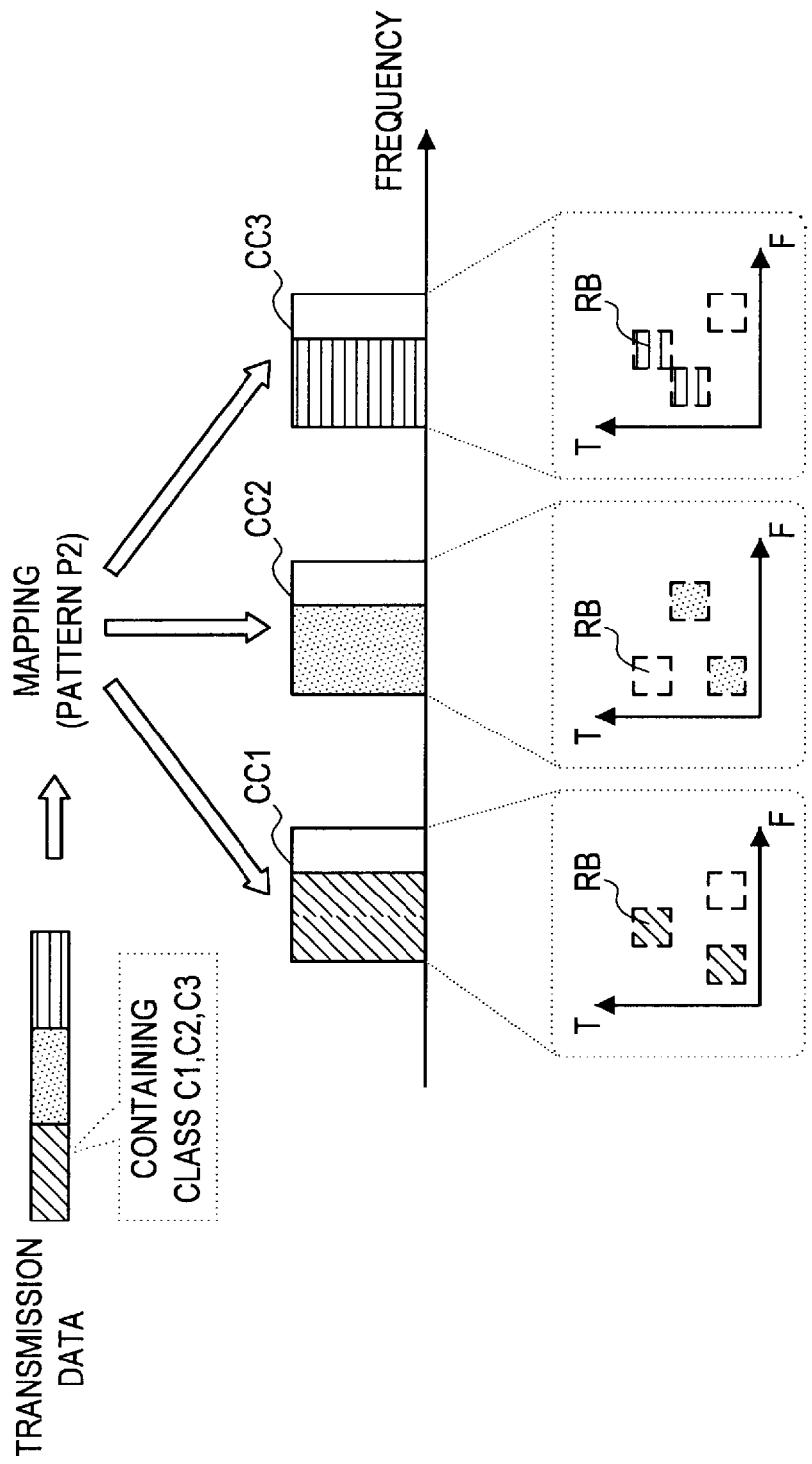

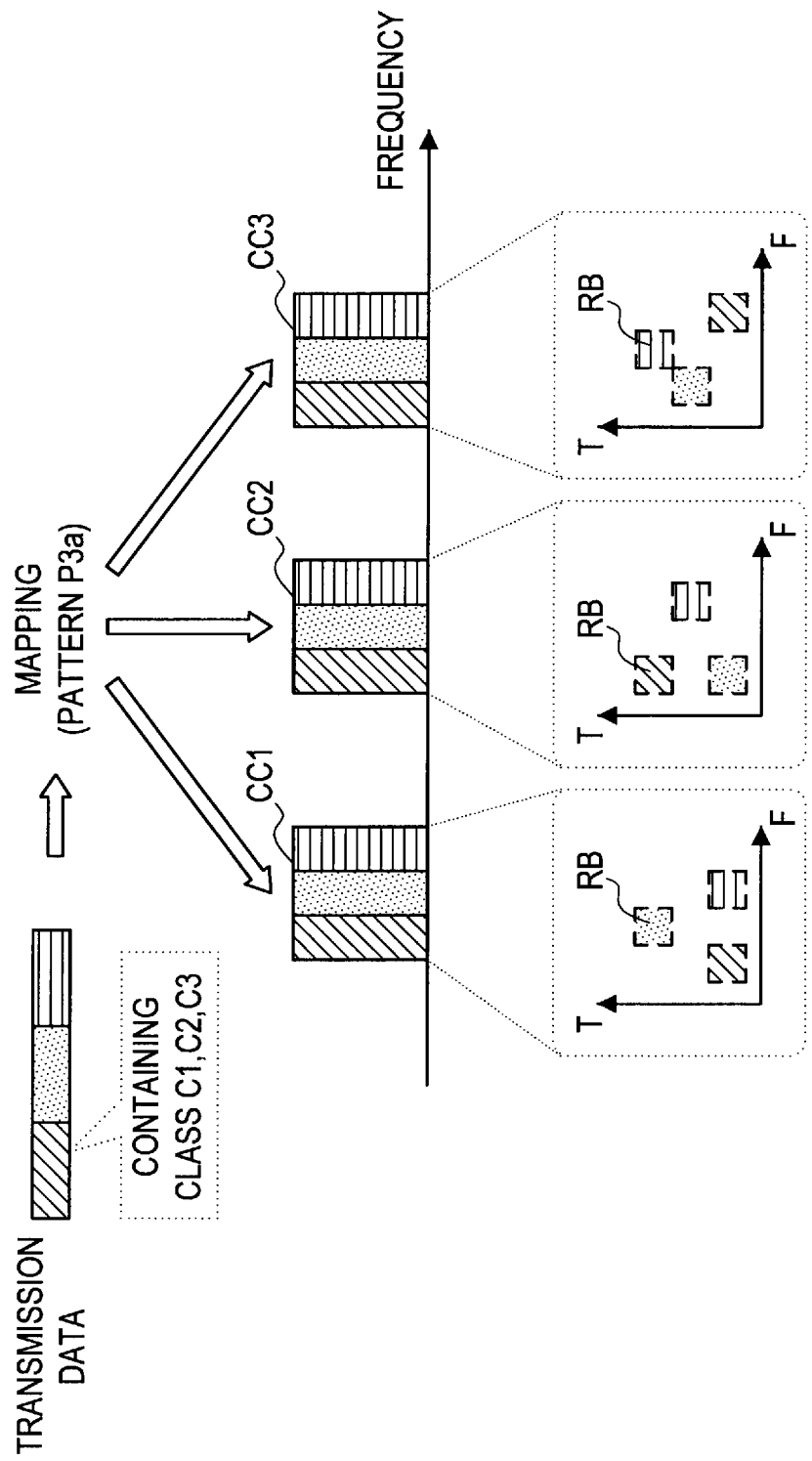

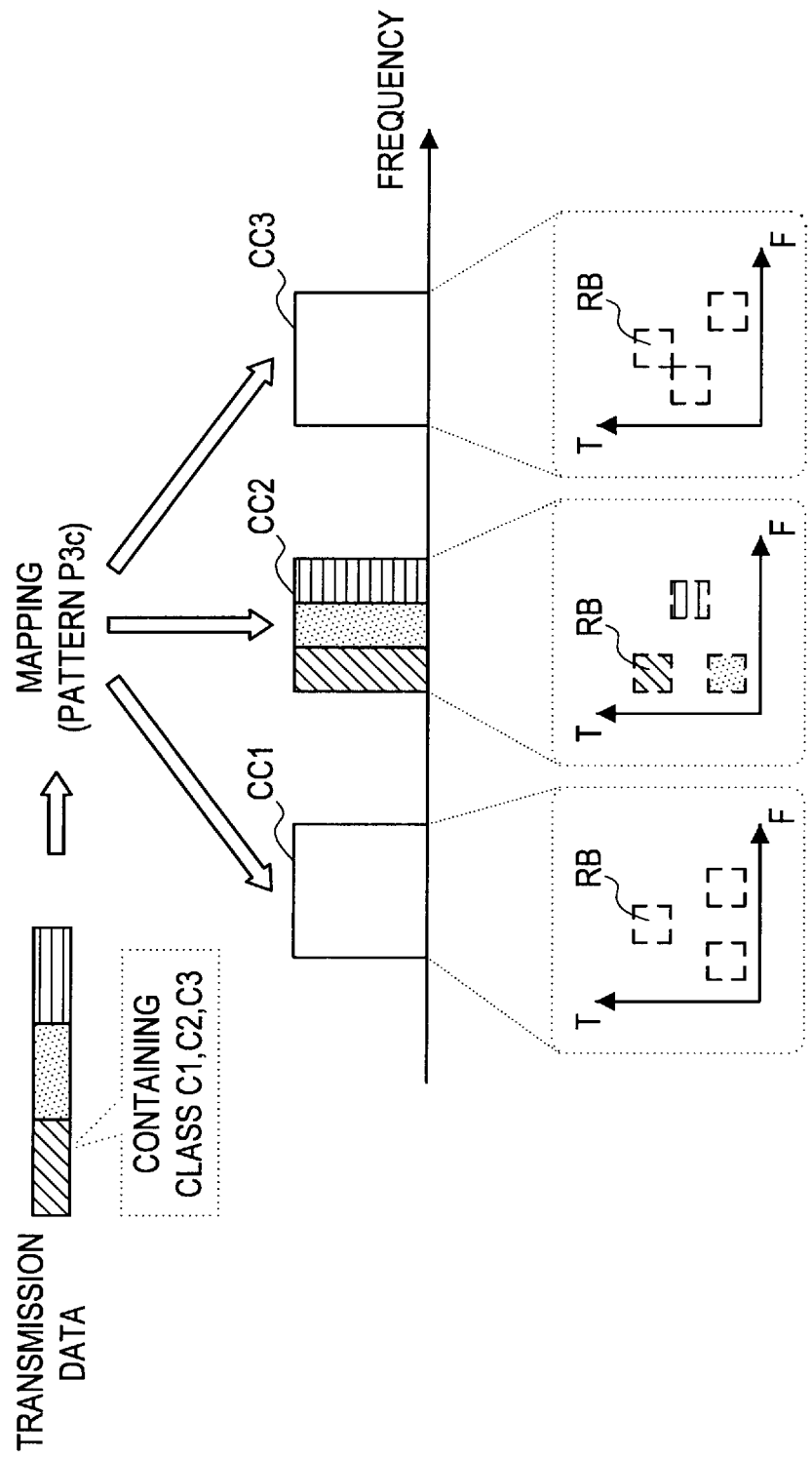

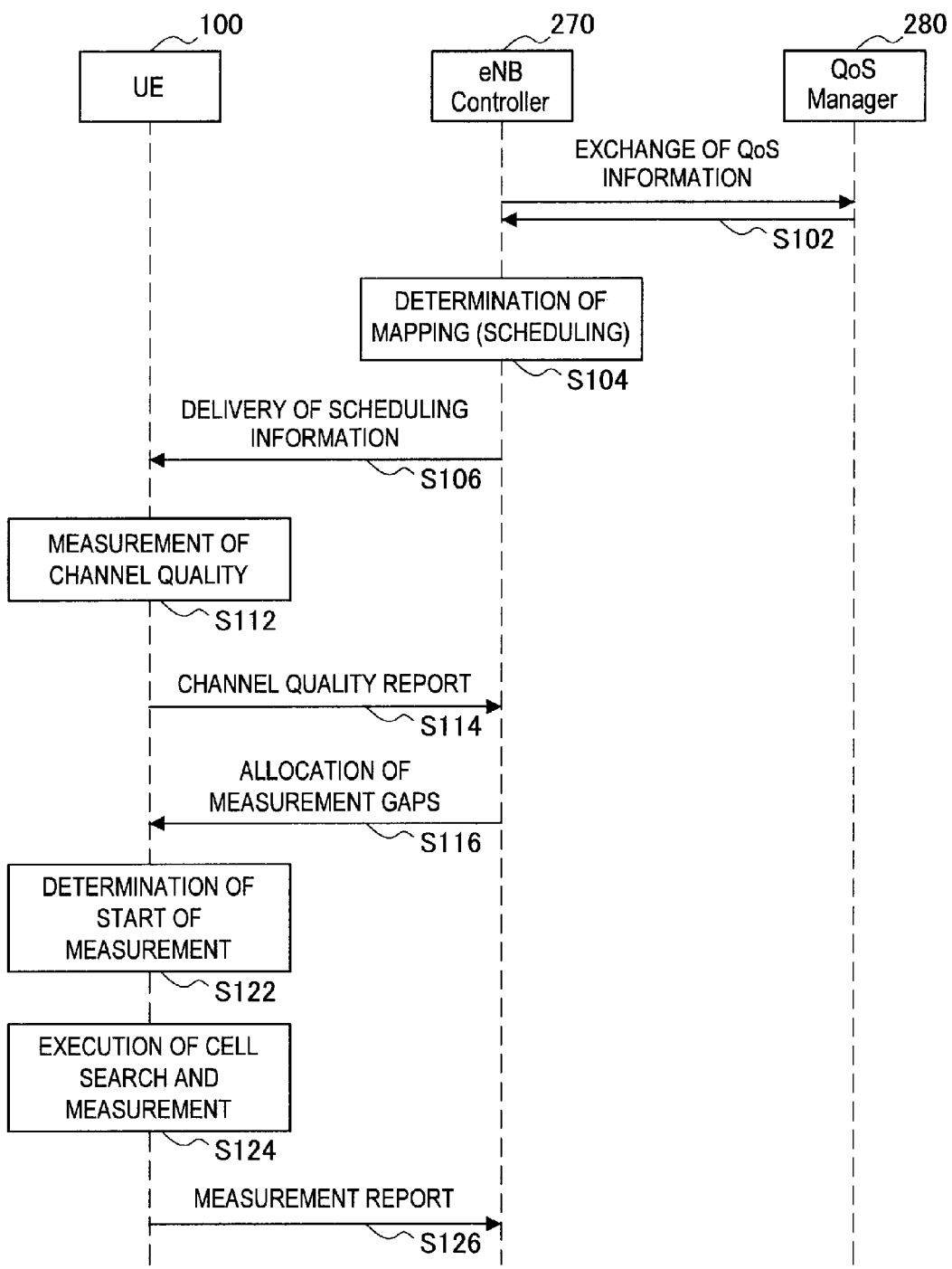

USER EQUIPMENT, BASE STATION, COMMUNICATION CONTROL METHOD, AND RADIO COMMUNICATION SYSTEM

TECHNICAL FIELD

The present invention relates to a user equipment, a base station, a communication control method, and a radio communication system.

BACKGROUND ART

In Long Term Evolution-Advanced (LTE-A), which is the next-generation cellular communication standard that is discussed in Third Generation Partnership Project (3GPP), introduction of technology called carrier aggregation (CA) has been studied. Carrier aggregation is technology that forms a communication channel between a user equipment (UE) and a base station (BS, or evolved Node B (eNB)) by aggregating a plurality of frequency bands that are supported in LTE, for example, and thereby improves communication throughput. Each frequency band included in one communication channel that is formed by the carrier aggregation is called a component carrier (CC). The bandwidths of frequency bands that are available in LTE are 1.4 MHz, 3.0 MHz, 5.0 MHz, 10 MHz, 15 MHz, and 20 MHz. Accordingly, if five bands of 20 MHz are aggregated as component carriers, a communication channel of 100 MHz in total can be formed.

Component carriers that are included in one communication channel in the carrier aggregation are not necessarily contiguous to one another in the frequency domain. The mode in which component carriers are arranged contiguous to one another in the frequency domain is called a contiguous mode. On the other hand, the mode in which component carriers are arranged not contiguous to one another is called a non-contiguous mode.

Further, in the carrier aggregation, the number of component carriers in an uplink and the number of component carriers in a downlink are not necessarily equal. The mode in which the number of component carriers in an uplink and the number of component carriers in a downlink are equal is called a symmetric mode. On the other hand, the mode in which the number of component carriers in an uplink and the number of component carriers in a downlink are not equal is called an asymmetric mode. For example, in the case of using two component carriers in an uplink and three component carriers in a downlink, it can be called asymmetric carrier aggregation.

Further, in LTE, any one of frequency division duplex (FDD) and time division duplex (TDD) can be used as duplex operation. Because the direction of a link (uplink or downlink) of each component carrier does not change in time in FDD, FDD is better suited to the carrier aggregation compared to TDD.

Meanwhile, a handover, which is a basic technique for achieving the mobility of a user equipment in the cellular communication standard, is one of the important subjects in LTE-A. In LTE, a user equipment measures the communication quality with a serving base station (a currently connected base station) and communication qualities with peripheral base stations and transmits a measurement report containing measurements to the serving base station. Receiving the measurement report, the serving base station determines whether a handover should be performed or not based on the measurements contained in the report. Then, if it is determined that a handover should be executed, a handover is carried out among a source base station (the serving base station before a handover), the user equipment, and a target base station (a serving base station after a handover) according to a prescribed procedure (e.g. Patent Literature 1 below).

CITATION LIST

Patent Literature

PTL 1: Japanese Unexamined Patent Application Publication No. 2009-232293

SUMMARY OF INVENTION

Technical Problem

However, no case has been reported where active consideration is given to how to carry out a handover procedure in a radio communication involving carrier aggregation.

For example, as described above, a measurement report in a typical handover procedure can contain results of measurements for a communication channel with a serving base station and a communication channel with peripheral base stations. However, in a radio communication involving carrier aggregation, if measurement is performed or a measurement report is sent based on the quality levels of all component carriers of those communication channels, the time cost necessary for processing increases. Further, there is a concern that resource efficiency decreases due to an increase in the amount of data. It is therefore an issue for the carrier aggregation technology to enhance the efficiency of processing from the start of measurement to the sending of a measurement report.

Meanwhile, determination whether a handover that is executed based on a measurement report should be performed or not affects the service quality of a radio communication service. Therefore, it is desirable to enhance the efficiency of the above-described processing related to a measurement report without degrading the service quality as much as possible.

In light of the foregoing, it is desirable to provide a novel and improved user equipment, base station, communication control method, and radio communication system that can efficiently execute processing related to a measurement report depending on a QoS requirement in a radio communication involving the carrier aggregation.

Solution to Problem

According to an embodiment of the present invention, an information processing apparatus, such as a base station, is configured to communicate with another information processing apparatus, and includes a receiver configured to receive quality information regarding quality of service for data to be transmitted. An allocating unit is included to determine how to allocate the data on component carriers according to the quality information. Also a notification unit is included and configured to notify the another information processing apparatus of allocation information that specifies how the data is to be allocated on the component carriers.

The allocating unit may allocate the data differently according to a quality information associated with a data classification for the data.

The allocating unit is configured to mix data with different quality of service criteria on a common communication channel using carrier aggregation of the component carriers.

The apparatus maps component carriers to quality of services classifications for data set by the allocating unit, which enables dynamic control at another information processing unit (such as a UE) from a time of starting channel quality measurement to providing a measurement report to the information processing apparatus.

A processor may be included that determines whether to perform a handover for the another information processing apparatus based on whether the measurement report indicates that a better channel quality is available to the another information processing apparatus from a peripheral information processing apparatus, the better channel quality being better with respect to a predetermined threshold.

The predetermined threshold may be varied for respective of the component carriers.

The allocating unit may be configured to select a mapping pattern for allocating data on the component carriers depending on one of variation of channel quality among the component carriers and resource availability of the respective component carriers.

The allocating unit determines the variation of channel quality among component carriers via a preceding channel quality report provided by the another information processing apparatus.

The allocating unit determines the variation of channel quality among component carriers by requesting an auxiliary channel quality report from the another information processing apparatus.

According to another embodiment, an information processing apparatus for communicating with another information processing apparatus uses a plurality of component carriers, and includes a receiver configured to receive allocation information that specifies how data to be transmitted is to be allocated among component carriers. The apparatus also includes a control unit configured to execute a process in order to conduct a handover procedure according to the allocation information, where the process can be one or more of transmitting a channel quality report or measurement report, or determining a timing when a measurement starts.

The allocation information may include information about how data is allocated on component carriers based on quality of service criteria.

The data may be categorized into one of a plurality of quality of service classifications.

The control unit is configured to send measurement data to the another information processing apparatus when the control unit determines that a channel quality available from a peripheral information processing apparatus is higher than a channel quality from the another information processing apparatus.

The control unit is configured to determine the channel quality being higher based on a comparison to a predetermined threshold or a greater measurement result.

The control unit is also configured to determine channel quality for a plurality of the component carriers.

The control unit is also configured to determine a start of measurement based on whether the channel quality satisfies a predetermined criteria, and compares a quality level of each resource block with a reference value provided by the another information processing apparatus.

The control unit starts measurement when respective quality level of resource blocks among the component carriers drop below corresponding predetermined values.

The control unit initiates measurement and sending of measurement information according to a procedure that varies depending on a mapping between the component carriers and corresponding quality of service for each data classification.

According to another embodiment, communications between an information processing apparatus and another information processing apparatus is performed according to a method and includes receiving quality information regarding quality of service for data to be transmitted. The method also determines with a processor how to allocate the data on component carriers according to the quality information. The another information processing apparatus is then notified of allocation information that specifies how the data is to be allocated on component carriers.

According to another embodiment, communications between an information processing apparatus and another information processing apparatus is controlled using step including receiving at the information processing apparatus allocation information that specifies how data to be transmitted is to be allocated among component carriers, and controlling with a processor a handover procedure according to the allocation information.

Advantageous Effects of Invention

As described above, the user equipment, the base station, the communication control method, and the radio communication system according to the embodiments of the present invention can efficiently execute processing related to a measurement report depending on a QoS requirement in a radio communication involving the carrier aggregation.

BRIEF DESCRIPTION OF DRAWINGS

FIG. 8 is an explanatory view to describe a first pattern of a mapping between a component carrier and a QoS class.

FIG. 9 is an explanatory view to describe a second pattern of a mapping between a component carrier and a QoS class.

FIG. 10A is an explanatory view showing a first example in a third pattern of a mapping between a component carrier and a QoS class.

FIG. 10C is an explanatory view showing a third example in the third pattern of a mapping between a component carrier and a QoS class.

FIG. 11 is a sequence chart showing an example of a flow of a communication control process in a radio communication system according to an embodiment.

DESCRIPTION OF EMBODIMENTS

Figure 1:
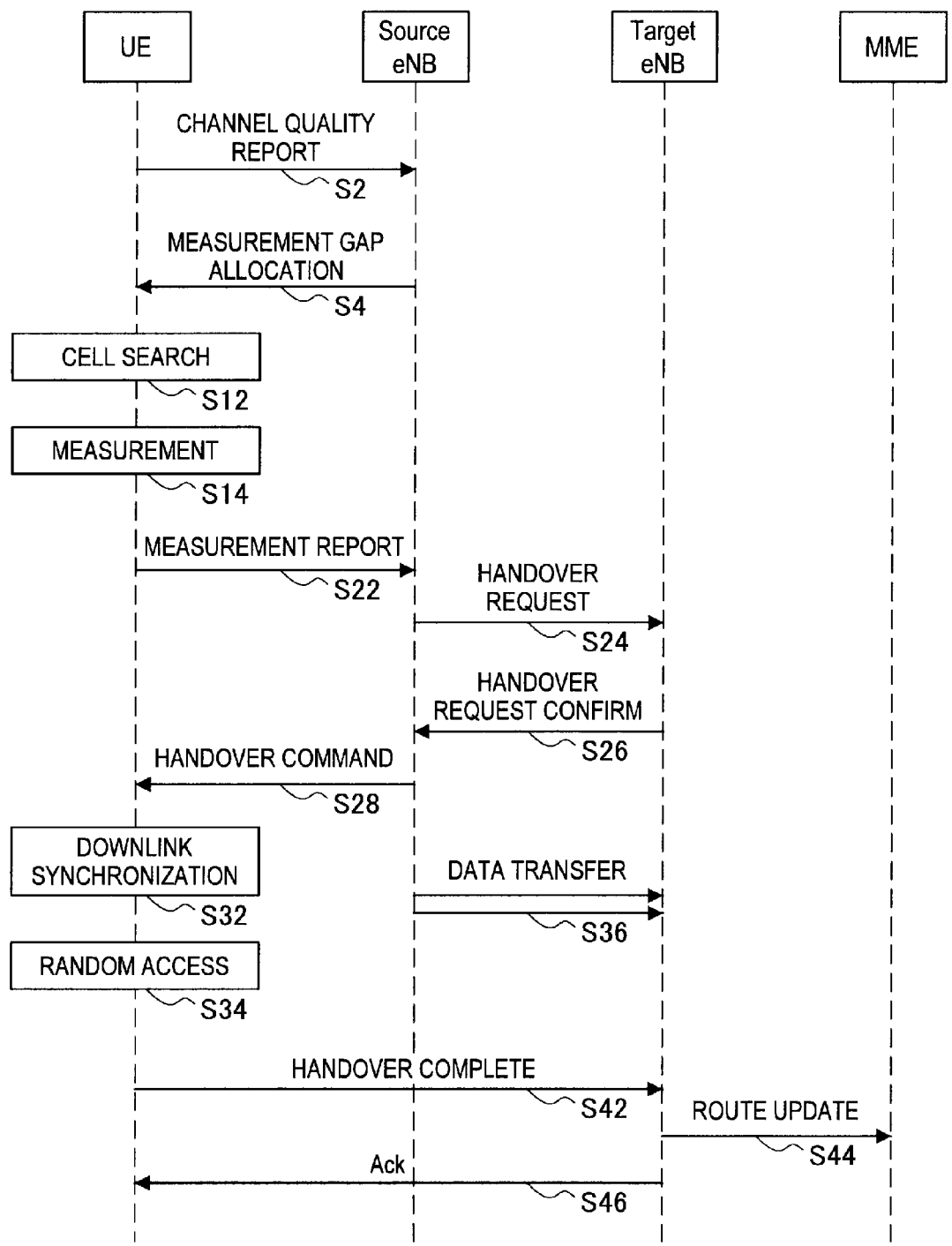
FIG. 1 is a sequence chart to describe a flow of a typical handover procedure.

Hereinafter, preferred embodiments of the present invention will be described in detail with reference to the appended drawings. Note that, in this specification and the appended drawings, structural elements that have substantially the same function and structure are denoted with the same reference numerals, and repeated explanation of these structural elements is omitted.

A preferred embodiment of the present invention will be described hereinafter in the following order.

1. Description of Related Art
    1-1. Handover Procedure
    1-2. Structure of Communication Resource
2. Outline of Radio Communication System
    2-1. Overview of System
    2-2. Classification Depending on QoS Requirement
    2-3. Channel Quality Report and Measurement Report
3. Exemplary Configurations of Devices According to Embodiment
    3-1. Exemplary Configuration of User Equipment
    3-2. Exemplary Configuration of Base Station
    3-3. Mapping between Component Carrier and Class
4. Flow of Process According to Embodiment
    4-1. Exchange of QoS Information
    4-2. Determination of Mapping
    4-3. Channel Quality Report
    4-4. Determination of Start of Measurement
    4-5. Measurement Report
5. Summary <1. Description of Related Art>
(1-1. Handover Procedure)

A technique related to the present invention is described hereinafter with reference to FIGS. 1 and 2. FIG. 1 shows a flow of a handover procedure in conformity with LTE in a radio communication not involving the carrier aggregation as an example of a typical handover procedure. In this example, a user equipment (UE), a source base station (source eNB), a target base station (target eNB), and a mobility management entity (MME) are involved in the handover procedure.

As a preliminary step toward a handover, the user equipment first reports the channel quality of a communication channel between the user equipment and the source base station to the source base station (step S2). The channel quality may be reported on a regular basis or when the channel quality falls below a specific reference value. The user equipment can measure the channel quality of the communication channel with the source base station by receiving a reference signal contained in a downlink channel from the source base station.

Then, the source base station determines the necessity of measurement based on the quality report received from the user equipment and, if measurement is necessary, allocates measurement gaps to the user equipment (step S4).

Then, the user equipment searches for a downlink channel from a peripheral base station (i.e. performs cell search) during the period of the allocated measurement gaps (step S12). Note that the user equipment can recognize a peripheral base station to search according to a list that is provided in advance from the source base station.

When the user equipment acquires synchronization with a downlink channel, the user equipment performs measurement by using a reference signal contained in the downlink channel (step S14). During this period, the source base station restricts an allocation of a data communication related to the user equipment so as to avoid occurrence of data transmission by the user equipment.

Upon completion of the measurement, the user equipment sends a measurement report containing a result of the measurement to the source base station (step S22). The result of the measurement contained in the measurement report may be the average value of measured values over a plurality of times of measurement or the like. Further, the result of the measurement may contain data about a plurality of frequency bands.

Receiving the measurement report, the source base station determines whether a handover should be performed based on the contents of the measurement report. For example, it can be determined that a handover is necessary when the channel quality of another base station in the periphery is higher than the channel quality of the source base station by a specific threshold or greater. In this case, the source base station determines to carry out a handover procedure with the relevant another base station as a target base station, and sends a handover request to the target base station (step S24).

Receiving the handover request, the target base station determines whether it is possible to accept the user equipment according to the availability of a communication service offered by itself or the like. When it is possible to accept the user equipment, the target base station sends a handover request confirm to the source base station (step S26).

Receiving the handover request confirm, the source base station sends a handover command to the user equipment (step S28). Then, the user equipment acquires synchronization with the downlink channel of the target base station (step S32). After that, the user equipment makes random access to the target base station by using a random access channel in a given time slot (step S34). During this period, the source base station forwards data addressed to the user equipment to the target base station (step S36). Then, after succeeded in the random access, the user equipment sends a handover complete to the target base station (step S42).

Receiving the handover complete, the target base station requests the MME to perform route update for the user equipment (step S44). Upon updating the route of user data by the MME, the user equipment becomes able to communicate with another device through a new base station (i.e. the target base station). Then, the target base station sends acknowledgement to the user equipment (step S46). A series of handover procedure thereby ends.

(1-2. Structure of Communication Resource)

Figure 2:
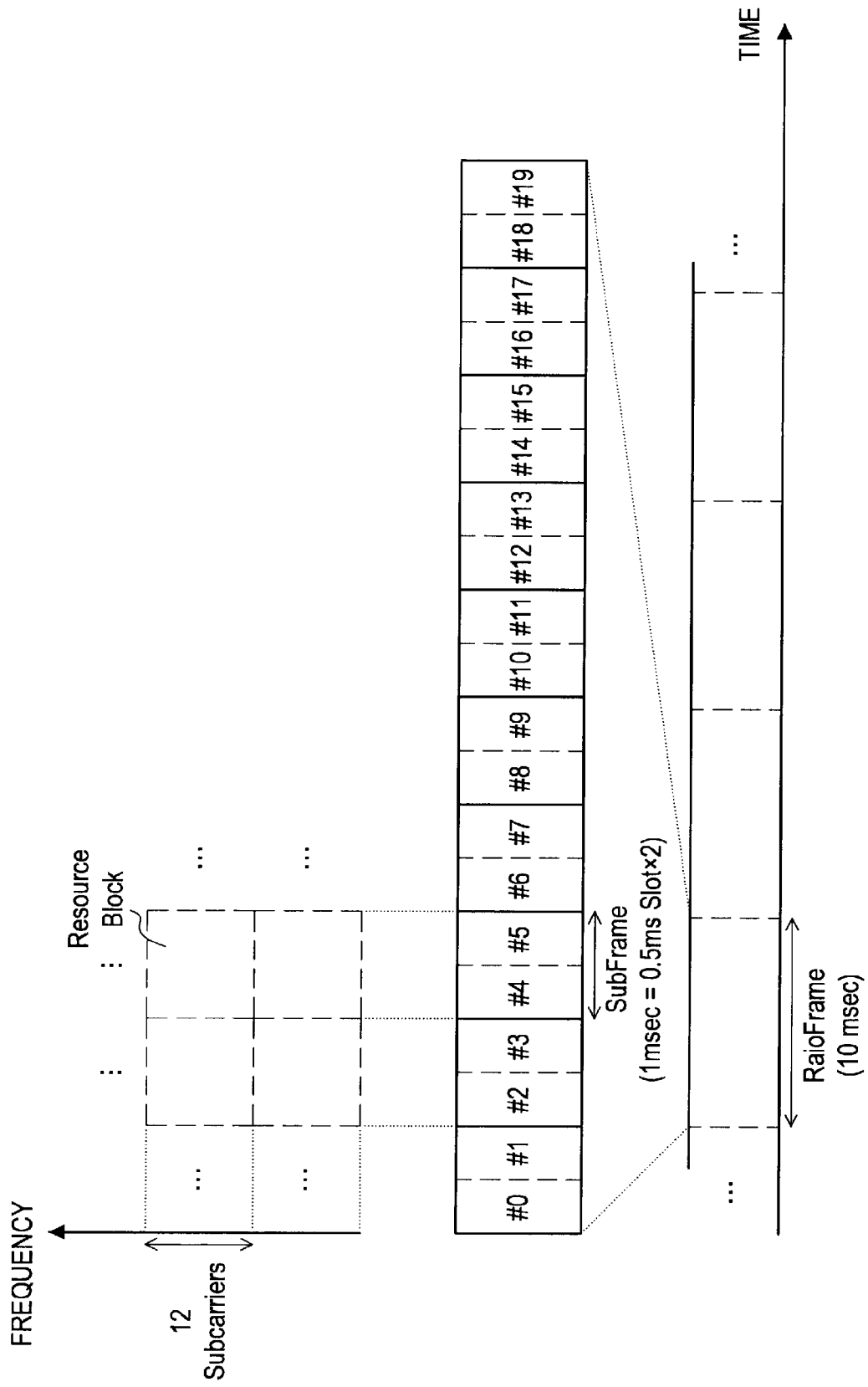
FIG. 2 is an explanatory view to describe an example of a structure of a communication resource.

FIG. 2 shows a structure of a communication resource in LTE as an example of a structure of a communication resource to which the present invention is applicable. Referring to FIG. 2A, the communication resource in LTE is segmented in the time direction into radio frames each having a length of 10 msec. One radio frame includes ten sub-frames, and one sub-frame is made up of two 0.5 nm slots. In LTE, the sub-frame is one unit of an allocation of a communication resource to each user equipment in the time direction. Such one unit is called a resource block. One resource block includes twelve sub-carriers in the frequency direction. Specifically, one resource block has a size of 1 msec by 12 sub-carriers in the time-frequency domain. Throughput of data communication increases as a larger number of resource blocks is allocated for data communication on condition of the same bandwidth and time length. Further, in such a structure of a communication resource, a part of radio frame with a given frequency band is reserved as a random access channel. The random access channel can be used for an access to a base station by a user equipment that has changed from an idle mode to an active mode or an initial access to a target base station in a handover procedure, for example.

<2. Outline of Radio Communication System>

(2-1. Overview of System)

Figure 3:
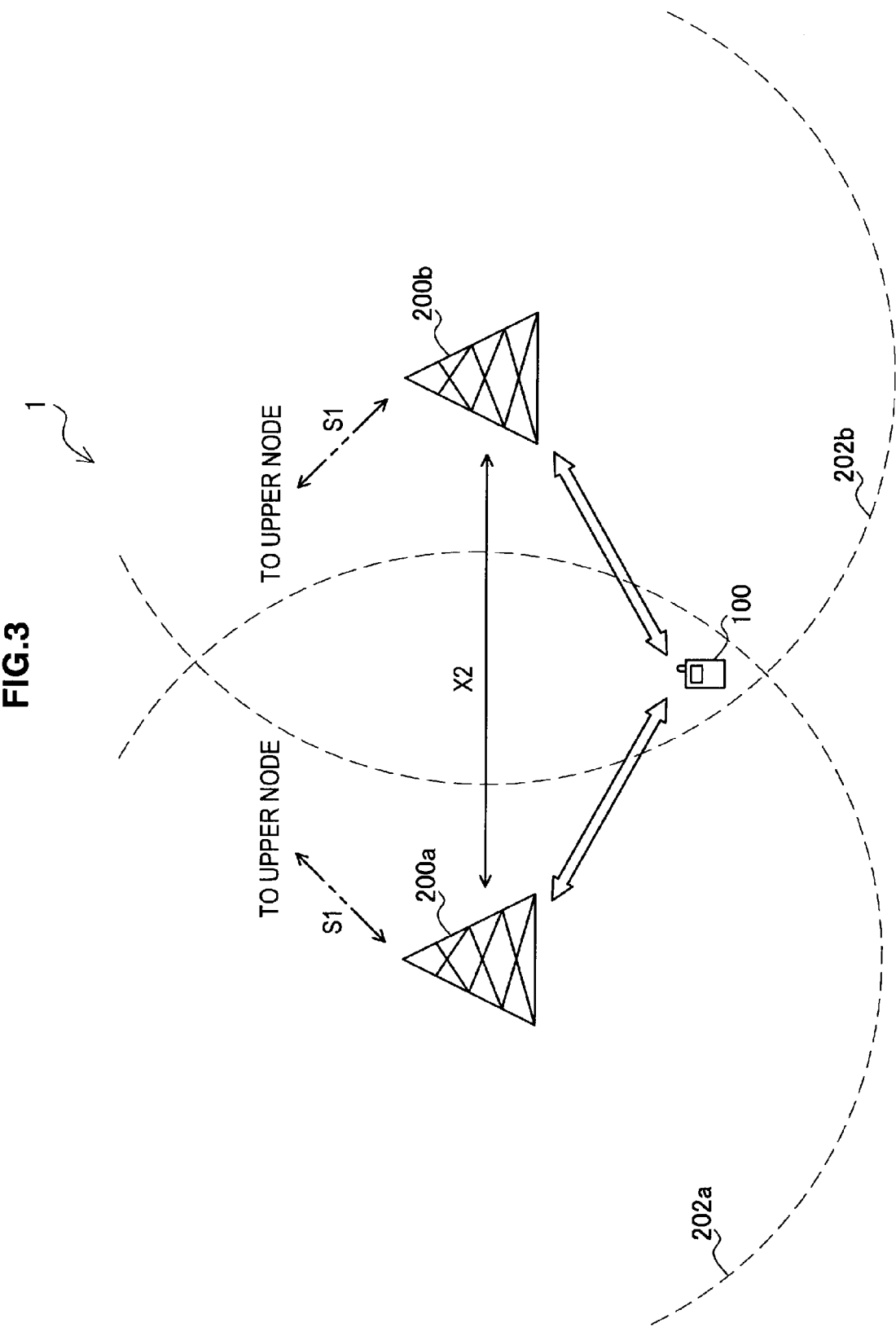
FIG. 3 is a schematic view showing an outline of a radio communication system according to an embodiment.

FIG. 3 is a schematic view showing an outline of a radio communication system 1 according to an embodiment of the present invention. Referring to FIG. 3, the radio communication system 1 includes a user equipment 100, a base station 200a and a base station 200b. It is assumed that the base station 200a is a serving base station for the user equipment 100.

The user equipment 100 is located inside a cell 202a where a radio communication service is provided by the base station 200a. The user equipment 100 can perform a data communication with another user equipment (not shown) via the base station 200a over a communication channel formed by aggregating a plurality of component carriers (i.e. by carrier aggregation). However, because the distance between the user equipment 100 and the base station 200a is not short, there is a possibility that a handover is required for the user equipment 100. Further, the user equipment 100 is located inside a cell 202b where a radio communication service is provided by the base station 200b. Therefore, the base station 200b can be a candidate for a target base station for a handover of the user equipment 100.

The base station 200a can communicate with the base station 200b through a backhaul link (e.g. X2 interface). Various kinds of messages in the handover procedure as described with reference to FIG. 1, scheduling information related to the user equipment belonging to each cell or the like, for example, can be sent and received between the base station 200a and the base station 200b. Further, the base station 200a and the base station 200b can communicate with an upper node such as a serving gateway (S-GW) or MME through an S1 interface, for example.

It should be noted that, when there is no particular need to distinguish between the base station 200a and the base station 200b in the following description of the specification, they are collectively referred to as a base station 200 by omitting the alphabetical letter at the end of the reference symbol. The same applies to the other elements.

(2-2. Classification Depending on QoS Requirement)

In the radio communication system 1, each data signal transmitted over the above-described communication channel is classified into any of two or more classes depending on a requirement for the service quality of traffic (which is referred to hereinafter as a QoS requirement). The two or more classes depending on the QoS requirement may be four classes (referred to hereinafter as QoS classes) shown in Table 1 below, for example. In Table 1, a class name, an example of an attribute related to a QoS requirement, and an example of a corresponding service are shown for each of the four QoS classes.

TABLE 1

Example of Classification

| Class Name | Example of Attribute about QoS Requirement | Example of Service |
|---|---|---|
| Conversational | Error Rate<br>Transfer Delay<br>Guaranteed Bit Rate | VoIP<br>Video Conference |
| Streaming | Error Rate<br>Transfer Delay<br>Guaranteed Bit Rate | Real-Time Video Distribution |
| Interactive | Error Rate | Web Access<br>Database Retrieval |
| Background | Error Rate | E-mail<br>SMS |

The first QoS class is a "Conversational" class. For traffic of the "Conversational" class, three attributes of an error rate, a transfer delay and a guaranteed bit rate, for example, can be defined as QoS requirements to be satisfied.

The error rate can be represented by a service data unit (SDU) error ratio or a residual bit error ratio. The SDU error ratio indicates the ratio of the SDU from which an error is detected to the transmitted SDUs. Further, the residual bit error ratio indicates the ratio of the bit not detected at the receiving end to the transmitted data bits. The transfer delay indicates the length of delay allowable at the time of transmission. Further, the guaranteed bit rate indicates a bit rate guaranteed for a user equipment by the radio communication system 1. Note that the maximum bit rate may be used instead of (or in addition to) the guaranteed bit rate.

As is understood from Table 1, for traffic belonging to the "Conversational" class, the radio communication system 1 schedules a communication resource in such a way that the error rate, the transfer delay and the guaranteed bit rate do not fall below specific reference values. An example of a service corresponding to the "Conversational" class is Voice over IP (VoIP), a video conference or the like.

The second QoS class is a "Streaming" class. For traffic of the "Streaming" class also, three attributes of the error rate, the transfer delay and the guaranteed bit rate, for example, can be defined as QoS requirements to be satisfied. However, reference values of the QoS requirements for those attributes may be different from those of the "Conversational" class. An example of a service corresponding to the "Streaming" class is real-time video distribution or the like.

The third QoS class is an "Interactive" class. For traffic of the "Interactive" class, only the error rate, for example, can be defined as a QoS requirement to be satisfied. An example of a service corresponding to the "Interactive" class is web access, database retrieval or the like.

The fourth QoS class is a "Background" class. For traffic of the "Background" class also, only the error rate, for example, can be defined as a QoS requirement to be satisfied. However, a reference value of the error rate may be different from that of the "Interactive" class. An example of a service corresponding to the "Background" class is E-mail, short messaging service (SMS) or the like.

It should be noted that the classification of QoS classes shown in Table 1 is just an example. For example, another QoS class may be defined for control signaling such as information management signaling (IMS). As for the QoS class for the control signaling, a stricter (or higher priority) QoS requirement than the above-described QoS class may be imposed. Which of those QoS classes each data signal should be classified into is determined by an individual service application and indicated in a header of a data packet, for example.

Figure 4:
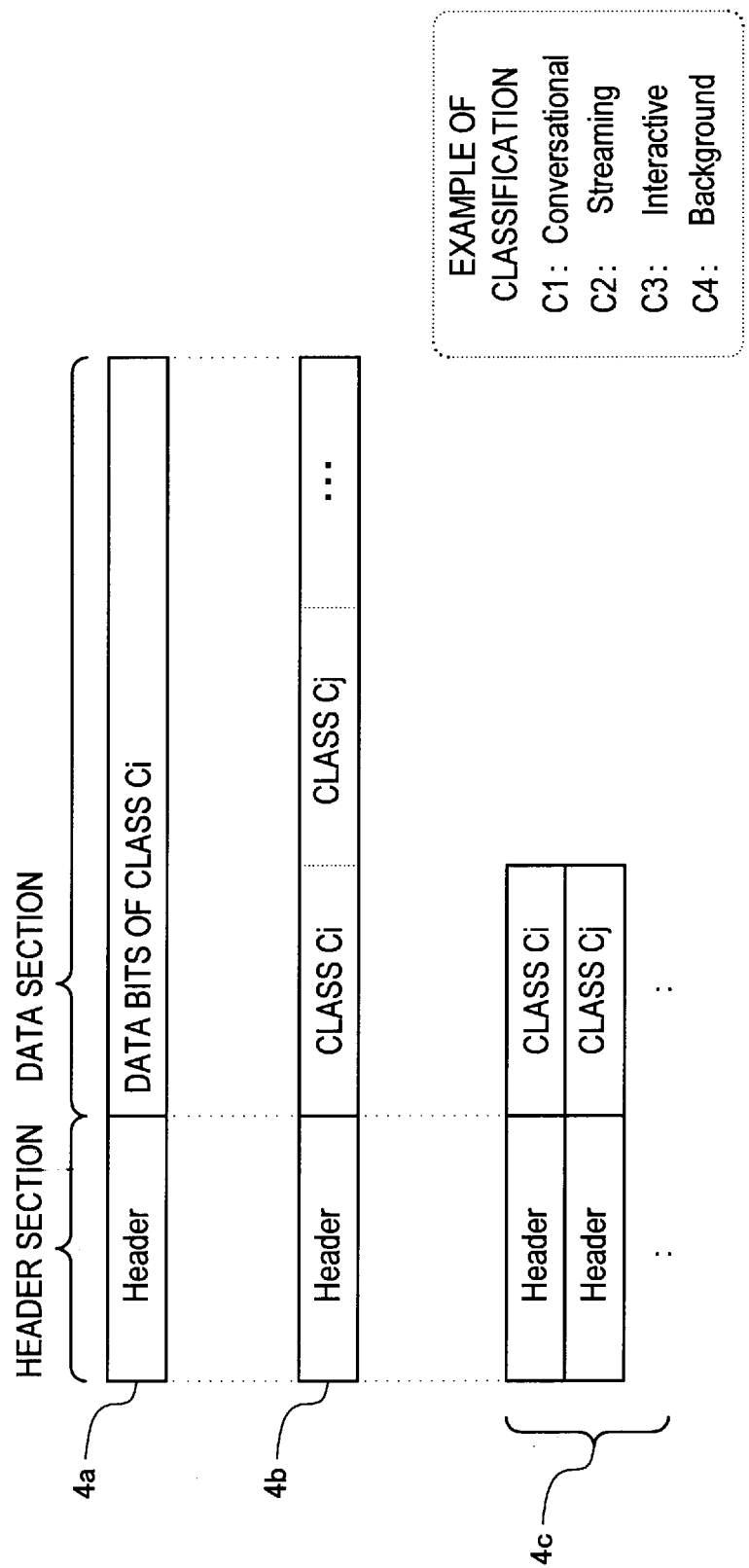
FIG. 4 is an explanatory view to describe an exemplary structure of a data packet.

FIG. 4 is an explanatory view to describe an exemplary structure of a data packet that can be transmitted in the radio communication system 1. Referring to FIG. 4, three kinds of data packets 4a, 4b and 4c are shown.

The data packet 4a is composed of a header section and a data section. The data section of the data packet 4a contains data bits of a class Ci. The class Ci may be any of C1="Conversational", C2="Streaming", C3="Interactive" and C4="Background". Thus, in this case, the data packet 4a is a packet that includes a data signal of a single class only.

The data section of the data packet 4b contains data bits of the class Ci and a class Cj.

The class Cj may be also any of C1="Conversational", C2="Streaming", C3="Interactive" and C4="Background" (which is, however, different from the class Ci). In this manner, data bits of different QoS classes may be contained in combination in one data packet.

The data packet 4c is a data packet that is distributed to a plurality of Multiple-Input Multiple-Output (MIMO) streams. A data section of the first MIMO stream contains data bits of the class Ci. A data section of the second MIMO stream contains data bits of the class Cj. In this manner, data bits of different QoS classes may be contained in the respective data packets distributed to a plurality of MIMO streams.

In this embodiment, the radio communication system 1 is configured to efficiently execute processing related to a measurement report in a radio communication involving the carrier aggregation in the environment where data signals of a plurality of QoS classes can be mixed.

(2-3. Channel Quality Report and Measurement Report)

The channel quality report is a report that is sent from the user equipment to the serving base station. Based on the channel quality report, the serving base station executes link adaptation (including rate control, power control or the like, for example) of a communication channel with the user equipment. As described earlier with reference to FIG. 1, the user equipment measures the channel quality of the communication channel by receiving a reference signal contained in a downlink channel from the serving base station and then sends the channel quality report to the serving base station. The measurement of the channel quality for the channel quality report is performed with respect to each resource block. Further, in this embodiment, the channel quality of each resource block which is measured for the channel quality report can be a condition to start measurement for a handover (a condition to trigger measurement).

The measurement report is also a report that is sent from the user equipment to the serving base station. Based on the measurement report, the serving base station determines whether a handover should be performed or not. As described earlier with reference to FIG. 1, the measurement of the channel quality for the measurement report is generally performed with respect to each communication channel between the serving base station or a peripheral base station and the user equipment. In this embodiment, on the other hand, because each communication channel is composed of a plurality of component carriers, the measurement can be performed with respect to each component carrier. Further, in this embodiment, data signals of a plurality of QoS classes can be mixed in one communication channel. Therefore, by the configurations of the user equipment and the base station (and an upper node) which are described in detail in the following sections, processing from the start of measurement to the sending of a measurement report is controlled dynamically according to a mapping between a component carrier and a QoS class.

<3. Exemplary Configurations of Devices According to Embodiment>

(3-1. Exemplary Configuration of User Equipment)

Figure 5:
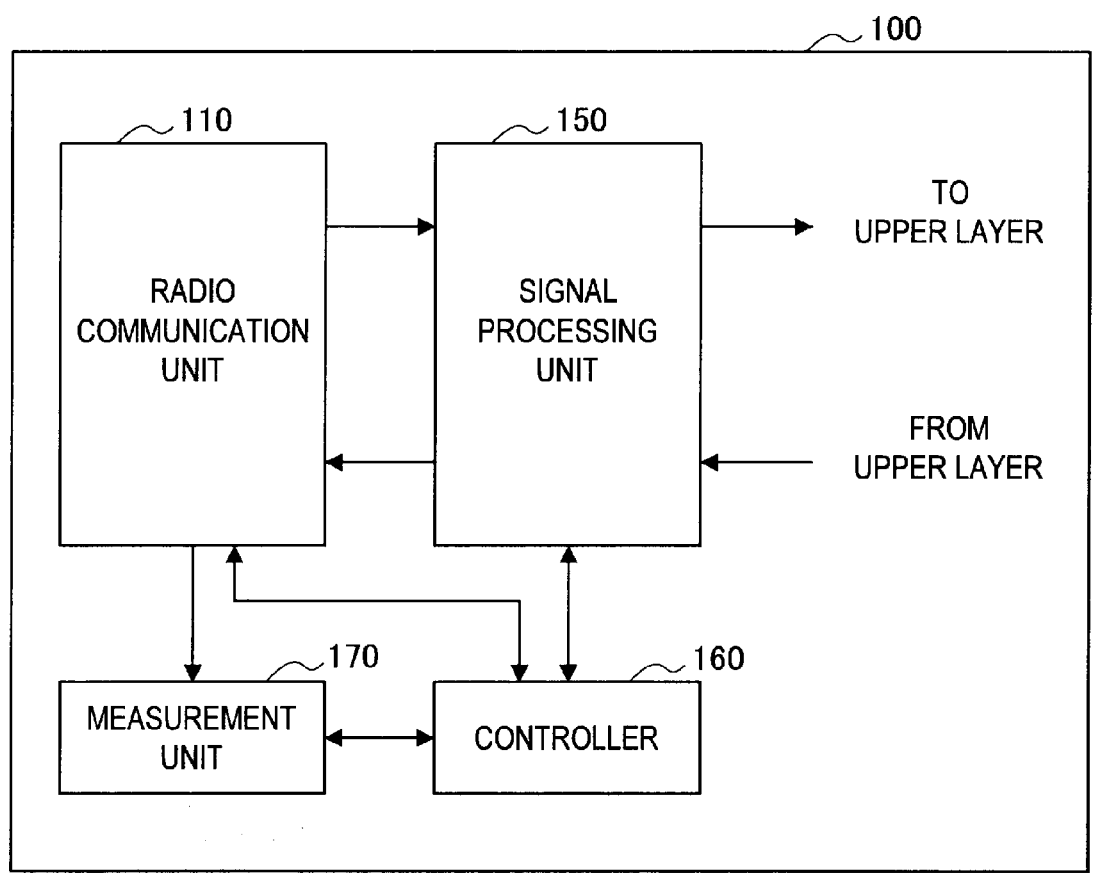
FIG. 5 is a block diagram showing an example of a configuration of a user equipment according to an embodiment.

FIG. 5 is a block diagram showing an example of a configuration of the user equipment 100 according to the embodiment. Referring to FIG. 5, the user equipment 100 includes a radio communication unit 110, a signal processing unit 150, a controller 160, and a measurement unit 170.

(Radio Communication Unit)

The radio communication unit 110 performs a radio communication with the base station 200 over a communication channel that is formed by aggregating a plurality of component carriers with use of the carrier aggregation technology.

Figure 6:
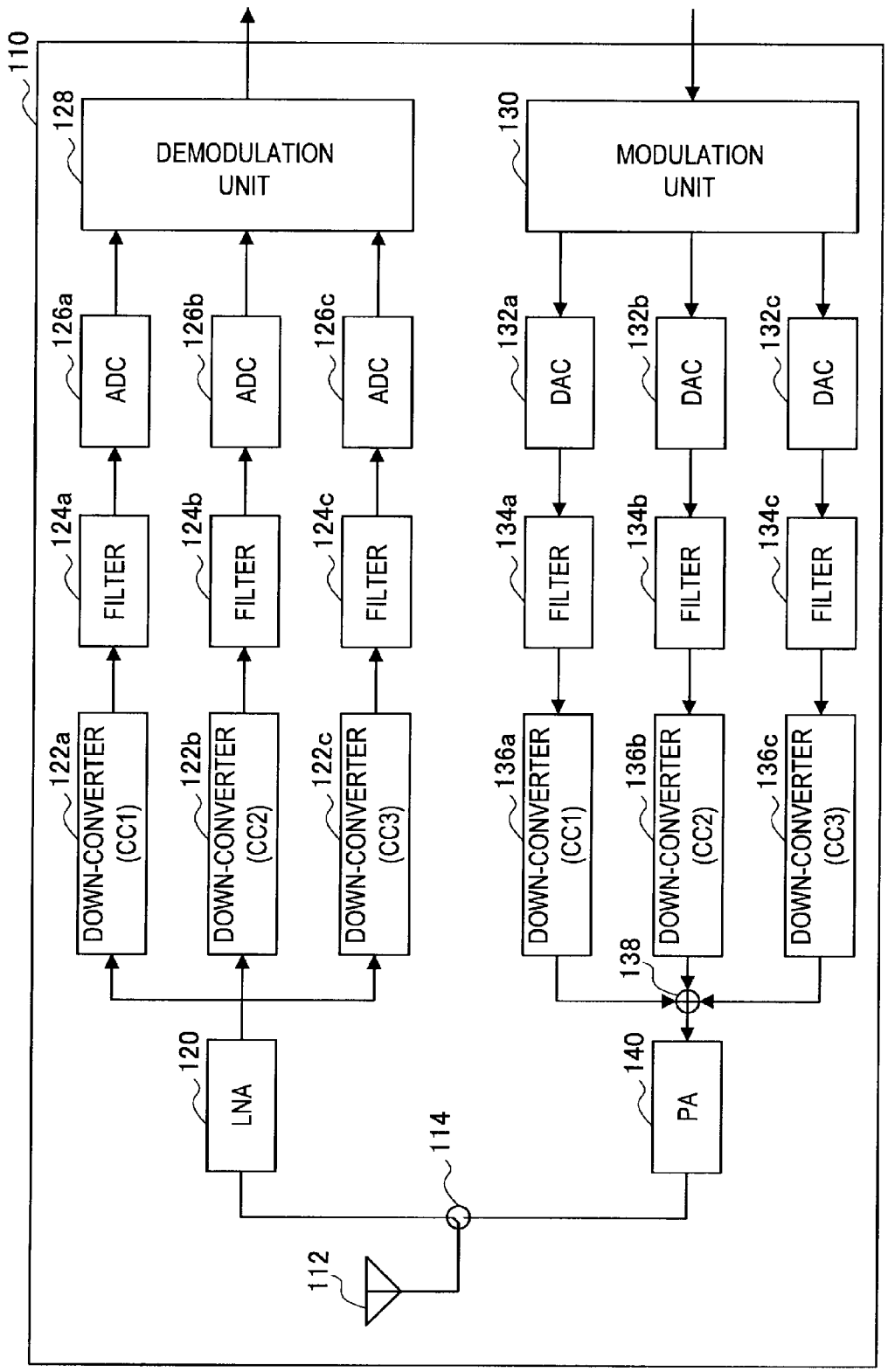
FIG. 6 is a block diagram showing an example of a detailed configuration of a radio communication unit according to an embodiment.

FIG. 6 is a block diagram showing an example of a more detailed configuration of the radio communication unit 110. Referring to FIG. 6, the radio communication unit 110 includes an antenna 112, a switch 114, a low noise amplifier (LNA) 120, a plurality of down-converters 122a to 122c, a plurality of filters 124a to 124c, a plurality of analogue-to-digital converters (ADCs) 126a to 126c, a demodulation unit 128, a modulation unit 130, a plurality of digital-to-analogue converters (DACs) 132a to 132c, a plurality of filters 134a to 134c, a plurality of up-converters 136a to 136c, a combiner 138, and a power amplifier (PA) 140.

The antenna 112 receives a radio signal sent from the base station 200 and outputs the received signal to the LNA 120 through the switch 114. The LNA 120 amplifies the received signal. The down-converter 122a and the filter 124a separate a baseband signal of the first component carrier (CC1) from the received signal amplified by the LNA 120. Then, the separated baseband signal is converted to a digital signal by the ADC 126a and output to the demodulation unit 128. Likewise, the down-converter 122b and the filter 124b separate a baseband signal of the second component carrier (CC2) from the received signal amplified by the LNA 120. Then, the separated baseband signal is converted to a digital signal by the ADC 126b and output to the demodulation unit 128. Further, the down-converter 122c and the filter 124c separate a baseband signal of the third component carrier (CC3) from the received signal amplified by the LNA 120. Then, the separated baseband signal is converted to a digital signal by the ADC 126c and output to the demodulation unit 128. After that, the demodulation unit 128 generates a data signal by demodulating the baseband signals of the respective component carriers and outputs the data signal to the signal processing unit 150.

Further, when a data signal is input from the signal processing unit 150, the modulation unit 130 modulates the data signal and generates baseband signals of the respective component carriers. Among those baseband signals, the baseband signal of the first component carrier (CC1) is converted to an analog signal by the DAC 132a. Then, a frequency component corresponding to the first component carrier in a transmission signal is generated from the analog signal by the filter 134a and the up-converter 136a. Likewise, the baseband signal of the second component carrier (CC2) is converted to an analog signal by the DAC 132b. Then, a frequency component corresponding to the second component carrier in the transmission signal is generated from the analog signal by the filter 134b and the up-converter 136b. Further, the baseband signal of the third component carrier (CC3) is converted to an analog signal by the DAC 132c. Then, a frequency component corresponding to the third component carrier in the transmission signal is generated from the analog signal by the filter 134c and the up-converter 136c. After that, the generated frequency components corresponding to the three component carriers are combined by the combiner 138, and the transmission signal is formed. The PA 140 amplifiers the transmission signal and outputs the transmission signal to the antenna 112 through the switch 114. Then, the antenna 112 sends the transmission signal as a radio signal to the base station 200.

Although the case where the radio communication unit 110 handles three component carriers is described in FIG. 6, the number of component carriers handled by the radio communication unit 110 may be two, or four or more.

Further, instead of processing the signals of the respective component carriers in the analog region as in the example of FIG. 6, the radio communication unit 110 may process the signals of the respective component carriers in the digital region. In the latter case, at the time of reception, a digital signal converted by one ADC is separated into the signals of the respective component carriers by a digital filter. Further, at the time of transmission, after digital signals of the respective component carriers are frequency-converted and combined, the signal is converted into an analog signal by one DAC. The load of the ADC and the DAC is generally smaller when processing the signals of the respective component carriers in the analog region. On the other hand, when processing the signals of the respective component carriers in the digital region, a sampling frequency for AD/DA conversion is higher, and the load of the ADC and the DAC can thereby increase.

(Signal Processing Unit)

Referring back to FIG. 5, an example of a configuration of the user equipment 100 is further described below.

The signal processing unit 150 performs signal processing such as deinterleaving, decoding or error correction on the demodulated data signal that is input from the radio communication unit 110. Then, the signal processing unit 150 outputs the processed data signal to an upper layer. Further, the signal processing unit 150 performs signal processing such as encoding or interleaving on the data signal that is input from the upper layer. Then, the signal processing unit 150 outputs the processed data signal to the radio communication unit 110.

(Controller)

The controller 160 controls the overall functions of the user equipment 100 by using a processing device such as a central processing unit (CPU) or a digital signal processor (DSP). For example, the controller 160 controls the timing of data communication by the radio communication unit 110 according to scheduling information that is received from the base station 200 by the radio communication unit 110. Further, the controller 160 controls the measurement unit 170 to measure the channel quality of each resource block by using a reference signal from the base station 200, which is a serving base station, and sends a channel quality report to the base station 200 through the radio communication unit 110. Further, the controller 160 receives control information related to a mapping between each of component carriers and the QoS class of each data signal from the base station 200 through the radio communication unit 110. The control information may be the same information as or different information from the above-described scheduling information. Then, the controller 160 controls at least one of the measurement of a channel quality by the measurement unit 170 and the sending of a measurement report according to a procedure which varies depending on the control information. The processing related to the measurement report is described in further detail later.

(Measurement Unit)

The measurement unit 170 measures the channel quality of each resource block in a component carrier by using a reference signal from the base station 200 according to control from the controller 160, for example. Further, the measurement unit 170 executes measurement for a handover with respect to each component carrier according to control from the controller 160. A result of the measurement executed by the measurement unit 170 is converted to a specific format for a measurement report by the controller 160 and sent to the base station 200 through the radio communication unit 110. After that, based on the measurement report, the base station 200 determines whether a handover should be performed or not for the user equipment 100.

Note that the controller 160 may make the measurement unit 170 start measurement at regular intervals. Alternatively, in this embodiment, the controller 160 may make the measurement unit 170 start measurement when the channel quality of each resource block that is measured for a channel quality report by the measurement unit 170 does not satisfy a specific reference. In any case, the controller 160 may create a measurement report and send it to the base station 200 when the channel quality of another base station in the periphery is higher than the channel quality of the serving base station by a specific threshold or greater as a result of the measurement, for example. Herein, threshold values (or reference values) varying for each component carrier may be used, for example. Note that, as described later, by which condition the measurement should be started (i.e. on a regular basis, according to a specific criterion or the like), a reference value to be used and so on can be specified by the base station 200.

(3-2. Exemplary Configuration of Base Station)

Figure 7A:
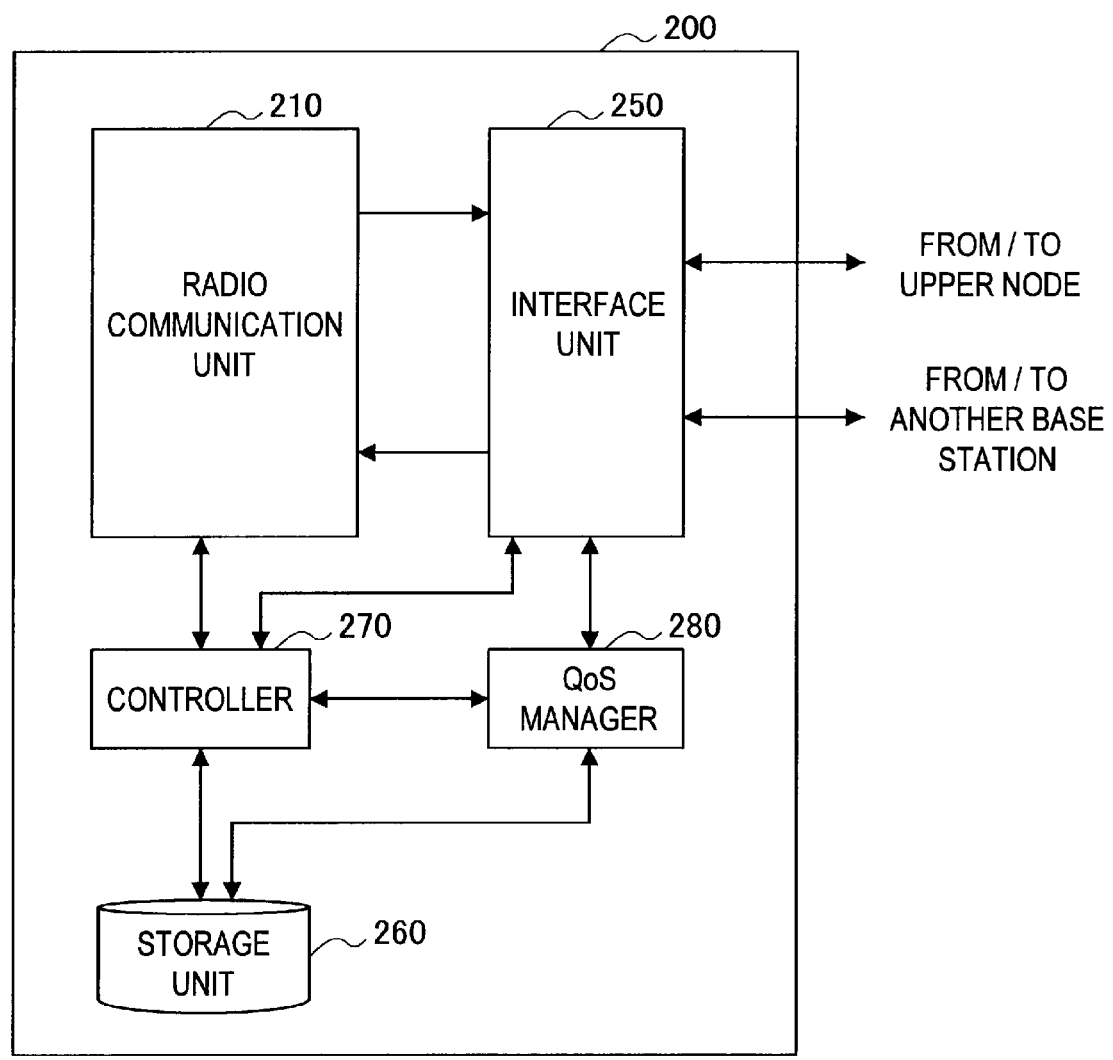
FIG. 7A is a block diagram showing an example of a configuration of a base station according to an embodiment.

FIG. 7A is a block diagram showing an example of a configuration of the base station 200 according to the embodiment. Referring to FIG. 7A, the base station 200 includes a radio communication unit 210, an interface unit 250, a storage unit 260, a controller 270 and a QoS manager 280.

(Radio Communication Unit)

A specific configuration of the radio communication unit 210 may be similar to the configuration of the radio communication unit 110 of the user equipment 100 which is described earlier with reference to FIG. 6, although the number of component carriers to be supported, a requirement of processing performance or the like is different. The radio communication unit 210 performs a radio communication with the user equipment over a communication channel that is formed by aggregating a plurality of component carriers with use of the carrier aggregation technology.

(Interface Unit)

The interface unit 250 mediates a communication between the radio communication unit 210, the controller 270 or the QoS manager 280 and an upper node through the S1 interface illustrated in FIG. 3, for example. Further, the interface unit 250 mediates a communication between the radio communication unit 210, the controller 270 or the QoS manager 280 and another base station through the X2 interface illustrated in FIG. 3, for example.

(Storage Unit)

The storage unit 260 holds CC management data that indicates which component carrier each user equipment is using for communication with respect to each of the user equipments belonging to the cell of the base station 200 by using a storage medium such as a hard disk, semiconductor memory or the like. Such CC management data can be updated by the controller 270 when an additional user equipment joins the cell of the base station 200 or when the existing user equipment changes a component carrier. Thus, the controller 270 can recognize which component carrier the user equipment 100 is using by referring to the CC management data.

Further, the storage unit 260 stores link characteristics data that indicates the characteristics of each link which is generated by the controller 270 based on the channel quality report sent from the user equipment 100. Further, the storage unit 260 stores QoS data indicating the attribute value, such as an error rate, a transfer delay or a guaranteed bit rate, of each QoS class which should be satisfied in each traffic. The link characteristics data and the QoS data are used at the time of scheduling of a communication resource in order to determine a mapping between each of component carriers and the QoS class of each data signal.

(Controller)

The controller 270 controls the overall functions of the base station 200 by using a processing device such as a CPU or a DSP. For example, the controller 270 schedules a communication resource for data transmission by the user equipment 100 based on the attribute value of each QoS class which should be satisfied in each traffic and which is notified from the QoS manager 280. For example, for traffic on which a strict requirement for transfer delay is imposed, it is preferred that the controller 270 allocates communication resources in parallel along the frequency direction as much as possible. By the scheduling of a communication resource by the controller 270, a mapping between each of component carriers and the QoS class of each data signal is defined. Three typical patterns (six variations) of such a mapping are further described later with examples.

Further, the controller 270 determines whether a handover to another base station by the user equipment 100 should be performed or not by using the above-described measurement report that is sent from the user equipment 100. Specifically, the controller 270 sends control information related to a mapping between each of component carriers and the QoS class of each data signal which is specified by the scheduling to the user equipment 100 through the radio communication unit 210. Furthermore, the controller 270 receives the measurement report that is created and sent by the user equipment 100 according to a procedure which varies depending on the control information through the radio communication unit 210. Then, the controller 270 determines whether a handover to another base station by the user equipment 100 should be performed or not by using the received measurement report.

(QoS Manager)

The QoS manager 280 commonly manages a QoS requirement to be satisfied in each traffic by using QoS data stored in the storage unit 260, for example. Further, prior to scheduling of a communication resource, the QoS manager 280 notifies the controller 270 of a QoS requirement for a data signal as a target of the scheduling. At this time, when there is a possibility that the QoS requirement is not satisfied, the QoS manager 280 negotiates with another base station or an upper node so as to satisfy the QoS requirement by a change in a path of a radio access network (RAN), utilization of a wired link or the like.

Figure 7B:
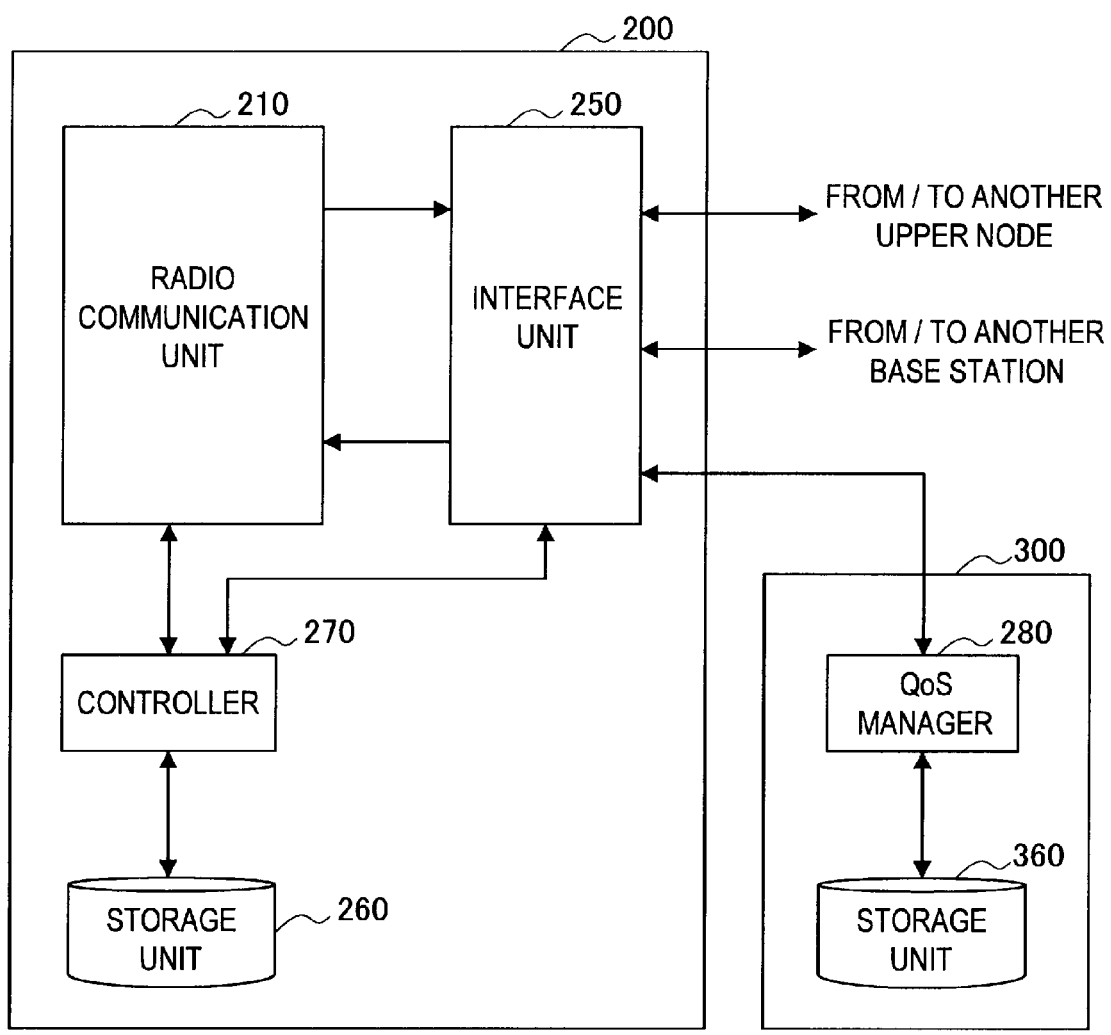
FIG. 7B is a block diagram showing an example of configurations of a base station and a QoS management node according to an alternative example.

Note that the QoS manager 280 may be placed in an upper node of the base station 200, rather than placed in the base station 200. The upper node of the base station 200 is a node corresponding to a serving gateway, MME or the like, for example. FIG. 7B is a block diagram showing such another example of a configuration. In FIG. 7B, the QoS manager 280, among the components of the base station 200 shown in FIG. 7A, is placed in an upper node 300 of the base station 200. Referring to FIG. 7B, the base station 200 includes the radio communication unit 210, the interface unit 250, the storage unit 260 and the controller 270. Further, the upper node 300 includes the QoS manager 280 and a storage unit 360. The storage unit 360 stores at least QoS data among the data stored in the storage unit 260 described above, for example.

(3-3. Mapping Between Component Carrier and Class)

Typical patterns of a mapping between each of component carriers and the QoS class of each data signal are described hereinafter with reference to FIGS. 8 to 10D.

(First Pattern)

FIG. 8 is an explanatory view to describe a first pattern (pattern P1) of a mapping between each of component carriers and the QoS class of each data signal. The first pattern is a pattern that can be employed when a data signal to be transmitted contains data bits of a single QoS class only.

Referring to FIG. 8, a data signal contains data bits that belong to the class C1 only. The controller 270 of the base station 200 evenly or unevenly distributes those data bits to the respective component carriers depending on a QoS requirement notified from the QoS manager 280. In the example of FIG. 8, resource blocks in the component carriers CC1, CC2 and CC2 are scheduled unevenly with a ratio of 3:2:1, respectively. The ratio can be determined depending on the channel quality of each of the component carriers or the availability of resources, for example.

(Second Pattern)

FIG. 9 is an explanatory view to describe a second pattern (pattern P2) of a mapping between each of component carriers and the QoS class of each data signal. The second pattern is a pattern that can be employed in the case where a data signal to be transmitted contains data bits of a plurality of QoS classes.

Referring to FIG. 9, a data signal contains data bits that belong to the classes C1, C2 and C3. The controller 270 of the base station 200 distributes those data bits to the respective component carriers in such a way that data bits classified into different classes are transmitted on different component carriers. For example, when the QoS requirement of the class C1 is the strictest (has the highest priority), the controller 270 allocates the data bit belonging to the class C1 to the component carrier CC1 with the highest channel quality. Further, the controller 270 allocates the data bit belonging to the class C2 whose QoS requirement is the second strictest (has the second highest priority) to the component carrier CC2 with the second highest channel quality. Furthermore, the controller 270 allocates the data bit belonging to the class C3 whose QoS requirement is the least strict to the remaining component carrier CC3. In the second pattern, because a data signal that belongs to one kind of QoS class only is transmitted in one component carrier, a cost for QoS management is reduced.

(Third Pattern)

FIGS. 10A to 10D are explanatory views to describe a third pattern of a mapping between each of component carriers and the QoS class of each data signal. The third pattern, like the second pattern, is a pattern that can be employed in the case where a data signal to be transmitted contains data bits of a plurality of QoS classes. However, in the third pattern, data bits classified into different classes from one another can be distributed to a single component carrier. That is, according to this pattern, a single component carrier can be shared by data bits of different classes. Hereinafter, four variations of the third pattern, i.e. patterns P3a to P3d, are described sequentially.

Referring to FIG. 10A (pattern P3a), a data signal contains data bits that belong to the classes C1, C2 and C3. The controller 270 of the base station 200 distributes those data bits to the respective component carriers with the same ratio. Specifically, the ratio of the data bits respectively belonging to the classes C1, C2 and C3 which are distributed to the component carrier CC1 is the same as the corresponding ratio in the component carriers CC2 and CC3. In the pattern P3a, because distribution of data bits can be determined by the common ratio, mapping is simplified and a processing cost for scheduling can be reduced. Further, by the effect of interleaving, it is expected to obtain better link characteristics than when simply distributing data bits belonging to the same class to the same component carrier.

Figure 10B:
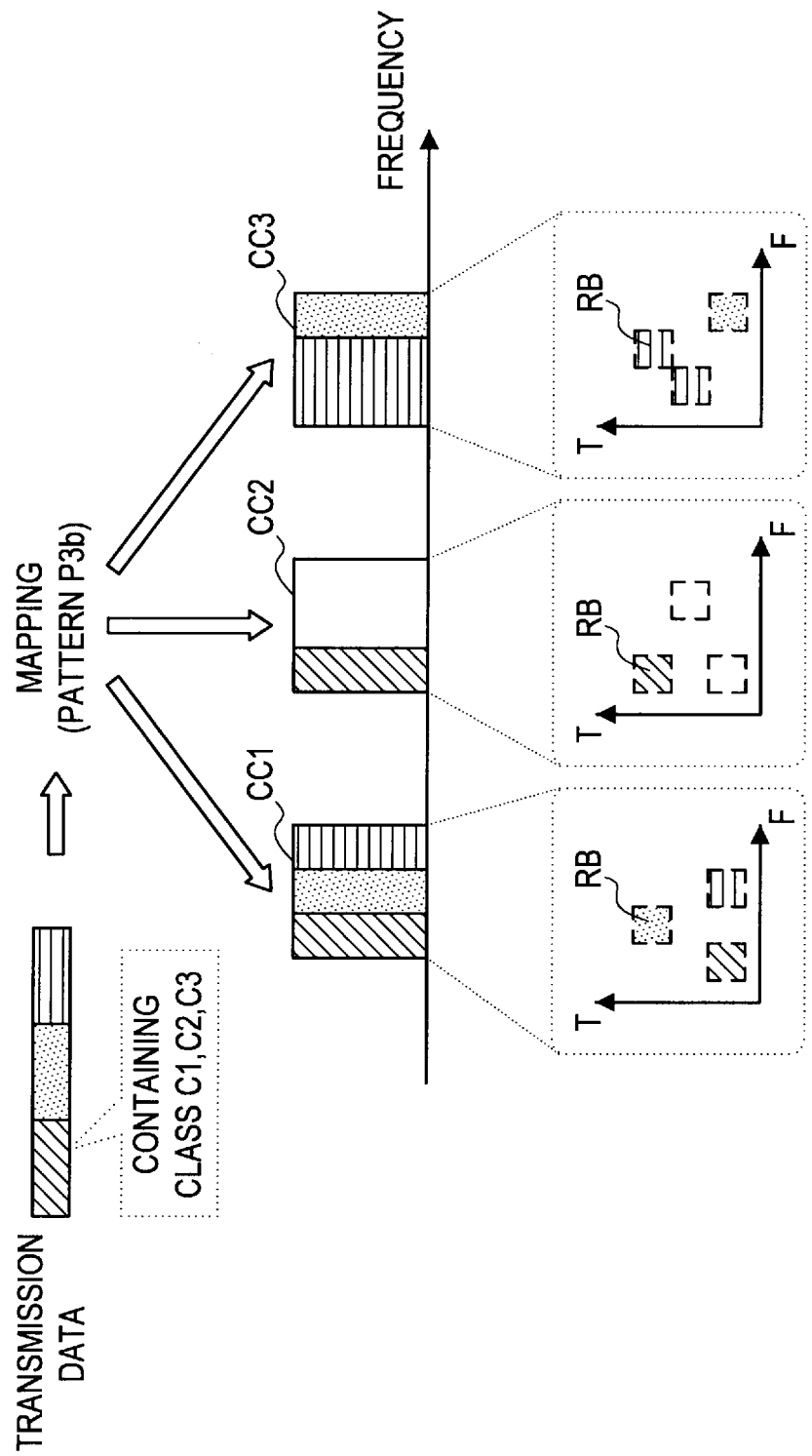
FIG. 10B is an explanatory view showing a second example in the third pattern of a mapping between a component carrier and a QoS class.

Referring to FIG. 10B (pattern P3b), a data signal contains data bits that belong to the classes C1, C2 and C3. The controller 270 of the base station 200 distributes those data bits to the respective component carriers with a different ratio. In the example of FIG. 10B, the data bits respectively belonging to the classes C1, C2 and C3 are distributed to the component carrier CC1. On the other hand, the data bit belonging to the class C1 only is distributed to the component carrier CC2. Further, the data bits respectively belonging to the classes C2 and C3 only are distributed to the component carrier CC3. In the pattern P3b, because the amount of the communication resource that is allocated to each component carrier can be increased or decreased depending on the strictness (priority) of a QoS requirement, more flexible scheduling can be performed to satisfy the QoS requirement.

Referring to FIG. 10C (pattern P3c), a data signal contains data bits that belong to the classes C1, C2 and C3. The controller 270 of the base station 200 distributes those data bits to one component carrier. The pattern P3c can be employed when the channel quality of one component carrier is significantly higher than the channel quality of the other component carriers and there are sufficient available resources.

Figure 10D:
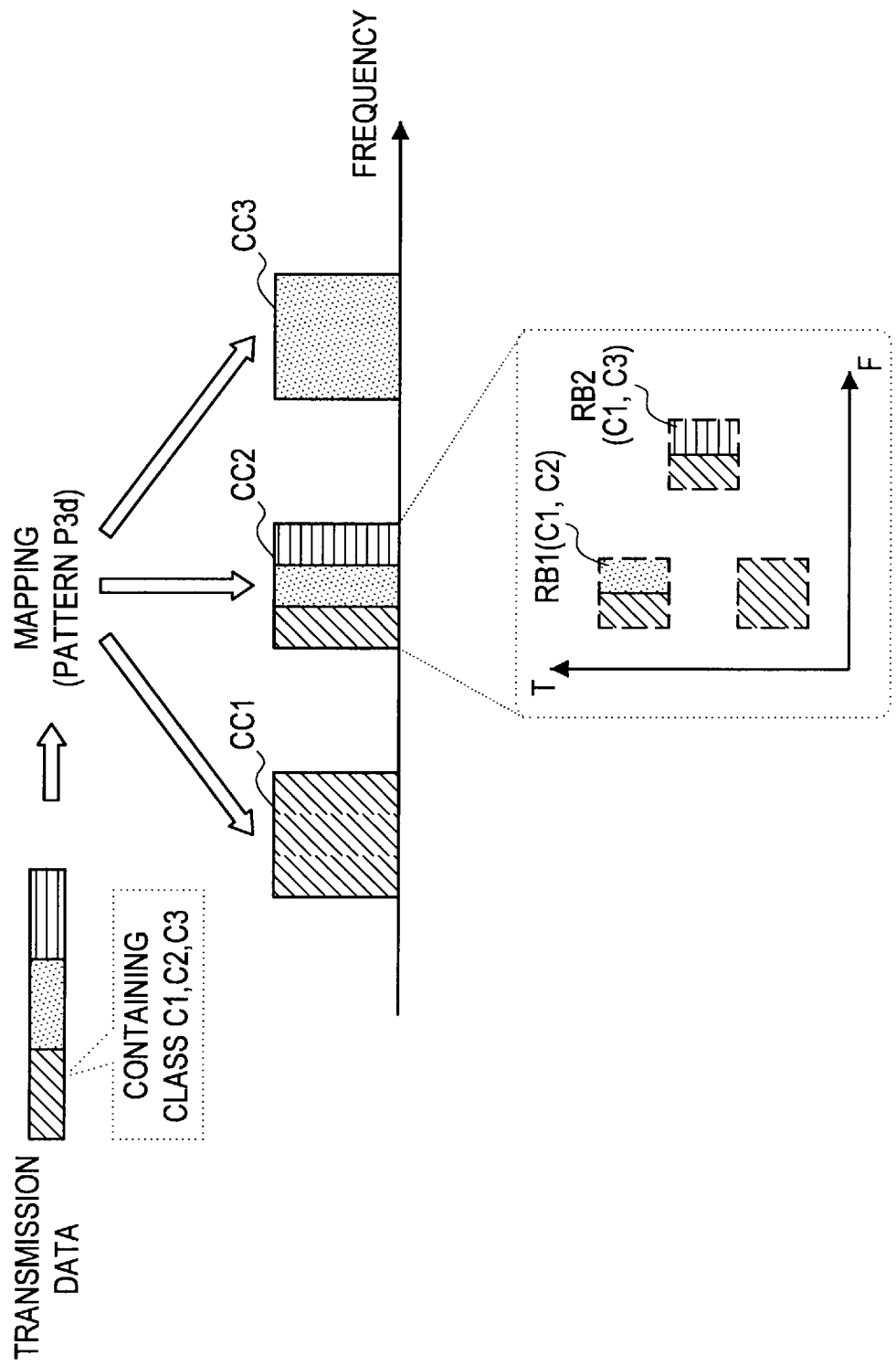
FIG. 10D is an explanatory view showing a fourth example in the third pattern of a mapping between a component carrier and a QoS class.

Referring to FIG. 10D (pattern P3d), a data signal contains data bits that belong to the classes C1, C2 and C3. The controller 270 of the base station 200 distributes those data bits to the respective component carriers with a different ratio. Further, in the pattern P3d, unlike the pattern P3b shown in FIG. 10B, the controller 270 distributes data bits that belong to different classes to one resource block. In the example of FIG. 10D, the data bits respectively belonging to the classes C1, C2 and C3 are distributed to the component carrier CC2. Then, the data bits respectively belonging to the classes C1 and C2 are distributed to a resource block RB1 of the component carrier CC2. Further, the data bits respectively belonging to the classes C1 and C3 are distributed to a resource block RB2 of the component carrier CC2. In the pattern P3d, still more flexible scheduling in units of resource blocks can be performed.

(Selection of Mapping Pattern)

At the time of scheduling of a communication resource, the controller 270 can select which of the above-described patterns should be employed depending on variation of the channel quality among the component carriers or the availability of resources of the respective component carriers. Table 2 below shows an example of a selection criterion of the mapping pattern. Note that the case where a data signal to be transmitted contains data bits of a plurality of QoS classes is mainly described hereinbelow.

TABLE 2

Example of Selection Criterion of Mapping Pattern

| Resource Availability | Variation of Quality | |
|---|---|---|
| | All CCs satisfy specific criterion | Some CCs do not satisfy specific criterion |
| All CCs satisfy specific criterion | Case 1-1 (Single class→P1) Multiple classes →Pattern P2 or P3a | Case 1-2 Pattern P3d |
| Some CCs do not satisfy specific criterion | Case 2-1 Pattern P3b | Case 2-2 Pattern P3c |

In Table 2, the availability of resources can be evaluated based on a resource usage rate of each of the component carriers, for example. Further, the variation of quality can be evaluated based on the channel quality of each of the component carriers that is obtained through the channel quality report, for example.

For example, it is assumed as the availability of resources that the usage rate is lower than a specific reference (i.e. there are sufficient available resources) for all component carriers. Further, when the channel quality is higher than a specific reference for all component carriers, the controller 270 can select the pattern P2 or the pattern P3a (case 1-1). In the case where it is desirable to reduce a cost necessary for QoS management, the pattern P2 may be selected. On the other hand, in the case where it is desirable to improve the link characteristics, the pattern P3 may be selected.

Further, when the availability of resources is the same as that of the case 1-1 and there is a component carrier whose channel quality does not satisfy a specific reference, the controller 270 can select the pattern P3d (case 1-2).

Furthermore, when, as the availability of resources, there is a component carrier whose usage rate is higher than a specific reference (i.e. there is no sufficient available resource) and the channel quality is higher than a specific reference for all component carriers, the controller 270 can select the pattern P3b (case 2-1). Further, when the availability of resources is the same as that of the case 2-1 and there is a component carrier whose channel quality does not satisfy a specific reference, the controller 270 can select the pattern P3c (case 2-2).

The controller 270 of the base station 200 determines a mapping between each of the component carriers and the QoS class of each data signal by using such a selection criterion as an example. Then, the controller 270 sends control information related to the mapping to the user equipment 100 through the radio communication unit 210. The control information related to the mapping may be scheduling information that is delivered through a control channel or a broadcast channel of a downlink, for example. Preferably, the control information related to the mapping indicates a mapping between a resource block that is contained in each component carrier and the QoS class of each data signal that is transmitted in the resource block. Further, the control information related to the mapping may contain an identification code for identifying the employed mapping pattern. After that, as described above, the controller 160 of the user equipment 100 executes measurement according to a procedure which varies depending on the control information sent from the base station 200 and sends a measurement report to the base station 200. In the following section, a flow of a process according to such patterns of mapping is described in detail.

<4. Flow of Process According to Embodiment>

FIG. 11 is a sequence chart showing an example of a flow of a communication control process in the radio communication system 1 according to the embodiment. Referring to FIG. 11, a communication control process as an example is shown along three lanes respectively corresponding to the user equipment (UE) 100 and the controller 270 and the QoS manager 280 of the base station (eNB) 200.

(4-1. Exchange of QoS Information)

First, prior to scheduling of a communication resource by the controller 270, information related to a QoS requirement is exchanged between the controller 270 and the QoS manager 280 (step S102). For example, when traffic of the "Conversational" class or the "Streaming" class exists, the QoS manager 280 notifies the value of (allowable) transfer delay for each class to the controller 270. Further, the QoS manager 280 notifies an index value of an error rate such as an SDU error ratio or a bit error ratio to the controller 270. Alternatively, the QoS manager 280 may notify a guaranteed bit rate to the controller 270, and the controller 270 may calculate an index value of an error rate to be satisfied based on the guaranteed bit rate. In response to such a notification, the controller 270 reply to the QoS manager 280 as to whether it is possible to schedule a communication resource so as to satisfy the QoS requirement. When it is difficult to make scheduling to satisfy the QoS requirement, the QoS manager 280 may negotiate with another base station or an upper node about a change in a path of RAN, utilization of a wired link or the like. Alternatively, the QoS manager 280 may determine to leave transmission of traffic of a class with a relatively low priority, such as the "Interactive" class or the "Background" class, until later.

(4-2. Determination of Mapping)

Then, the controller 270 determines a mapping between each of component carriers and the QoS class of each data signal for the user equipment 100 based on the QoS requirement notified from the QoS manager 280, and schedules a communication resource (step S104). The determination of the mapping is made depending on variation of the channel quality among the component carriers and the availability of resources of the respective component carriers as described above. Typically, variation of the channel quality among the component carriers may be figured out through a preceding channel quality report (step S114 described later) in the repetitive communication control process of FIG. 11. Alternatively, the controller 270 of the base station 200 may request, to the user equipment 100, an auxiliary channel quality report used for determining a mapping at step S104, separately from the step S114. After that, the controller 270 delivers scheduling information indicating a result of the mapping to the user equipment 100 through a control channel or a broadcast channel of a downlink (step S106). In this step, the controller 270 may explicitly notify an identification code for identifying a pattern of mapping to the user equipment 100. Further, when data signals of a plurality of QoS classes are mixed, the controller 270 may additionally notify an index value such as the minimum necessary signal to interference and noise ratio (SINR) or the minimum reception power for each of the QoS classes to the user equipment 100.

(4-3. Channel Quality Report)

Meanwhile, the user equipment 100 measures the channel quality of each resource bock by receiving a reference signal contained in each resource block of each component carrier of a downlink channel from the base station 200 (step S112). Then, the user equipment 100 transmits a channel quality report that is created by using the measured quality level to the base station 200 (step S114). The contents of the channel quality report can vary depending on the pattern of mapping which is known from the control information that has been acquired from the base station 200 by the user equipment 100 in the step S106. The contents of the channel quality report that correspond to each pattern of mapping are described hereinbelow.

(In First Pattern)

In the first pattern illustrated in FIG. 8, a data signal of one kind of QoS class only is mapped to all of the component carriers constituting a communication channel. In this case, the user equipment 100 may include only the representative value (e.g. the average value, the minimum value or the like) of the quality levels of all resource blocks of all the component carriers, for example, into the channel quality report.

(In Second Pattern)

In the second pattern illustrated in FIG. 9, a data signal of one kind of QoS class is mapped to each single component carrier constituting a communication channel. In this case, the user equipment 100 may determine the representative value of the quality levels of all resource blocks in each component carrier for each of the component carriers and include those representative values into the channel quality report, for example. Alternatively, the user equipment 100 may include only the representative value with the lowest quality level among the representative values of the quality levels of the respective component carriers into the channel quality report, for example. Further, the user equipment 100 may include the representative value of the quality levels for the component carrier corresponding to a QoS class with a high priority (e.g. the "Conversational" class, the "Streaming" class or the like), for example, into the channel quality report.

Further, the user equipment 100 may calculate one representative value in the whole communication channel by weighted summing of the representative values of the quality levels of the respective component carriers according to the following expression (1) by using a weight depending on a QoS requirement of each QoS class, for example. The weight depending on a QoS requirement of each QoS class may be a value depending on an index value such as the minimum necessary SINR or the minimum reception power that is notified from the base station 200, for example.

Expression 1

$$Q_{all} = \sum_{i=1}^{n} w_{cci} Q_{cci} \qquad (1)$$

In the expression (1), $Q_{a11}$ is the representative value of the quality levels which is a single value calculated in the whole communication channel. Further, i is a component carrier number, n is the number of component carriers, $w_{cci}$ is a weight of each QoS class corresponding to each component carrier, and $Q_{cci}$ is the representative value of the quality levels of each component carrier. The single representative value of the quality levels in the whole communication channel which is calculated in this manner may be also included into the channel quality report.

(In Third Pattern)

In the third pattern illustrated in FIGS. 10A to 10D, there is a possibility that data signals of a plurality of kinds of QoS classes is mapped to a single component carrier. In this case, the user equipment 100 may determine the representative value of the quality levels of resource blocks corresponding to a QoS class with a high priority in each component carrier for each of the component carriers and include those representative values into the channel quality report, for example. Alternatively, the user equipment 100 may determine the representative value of the quality levels of the respective QoS classes in a plurality of component carriers, for example, and include the representative values of the respective QoS classes into the channel quality report.

Further, the user equipment 100 may calculate a single representative value in the whole communication channel by weighted summing of the representative values of the quality levels of the respective QoS classes according to the following expression (2) by using a weight depending on a QoS requirement of each QoS class, for example. The weight depending on a QoS requirement of each QoS class may be a value depending on an index value such as the minimum necessary SINR or the minimum reception power that is notified from the base station 200, for example, as described above.

Expression 2

$$Q_{all} = \sum_{j=1}^{m} v_{c\_j} Q_{c\_j} \qquad (2)$$

In the expression (2), $Q_{a11}$ is the representative value of the quality levels which is a single value calculated in the whole communication channel. Further, j is a class number, n is the number of classes, $v_{c\_j}$ is a weight of each QoS class, and $Q_{c\_j}$ is the representative value of the quality levels of each QoS class. The single representative value of the quality levels in the whole communication channel which is calculated in this manner may be also included into the channel quality report.

As described above, by dynamically calculating the representative value of the quality levels to be included into the channel quality report according to a mapping between each of the component carriers and the QoS class of each data signal, it is possible to reduce the amount of the communication resource necessary for the channel quality report. Further, in a radio communication involving the carrier aggregation also, it is possible to efficiently create the effective channel quality report.

(4-4. Determination of Start of Measurement)

Then, measurement gaps are allocated to the user equipment 100 by the controller 270 of the base station 200 (step S116). Further, the controller 270 notifies the user equipment 100 of information to be used for execution of measurement by the user equipment 100, such as information indicating by which condition measurement should be started and a reference value to be used, for example.

After that, the user equipment 100 makes a determination about the start of measurement (step S122). For example, when it is notified from the base station 200 that measurement should be executed on a regular basis, the user equipment 100 starts measurement at regular intervals counted by a timer. On the other hand, when the start of measurement is determined based on whether the channel quality satisfies a specific reference or not, the user equipment 100 compares the quality level of each resource block measured for the channel quality report with a reference value notified from the base station 200. The specific reference in the latter case may be a reference which varies depending on the pattern of mapping. The details of the determination about the start of measurement which correspond to each pattern of mapping are described hereinbelow.

(In First Pattern)

In the first pattern illustrated in FIG. 8, a data signal of one kind of QoS class only is mapped to all of the component carriers constituting a communication channel as described above. In this case, the user equipment 100 may determine to start measurement when the quality level of any one resource block among all the component carriers becomes lower than a reference value.

Herein, reference values varying from one component carrier to another may be used, for example. The reference values used herein may vary depending on the number of resource blocks allocated to each component carrier. Alternatively, the user equipment 100 may determine to start measurement when the representative value of the quality levels in any one component carrier (the minimum value, the average value or the like of the quality level of each resource block) becomes lower than a reference value, for example. Further, the user equipment 100 may determine to start measurement when the representative value of the quality levels of a component carrier to which the most communication resources are allocated becomes lower than a reference value.

(In Second Pattern)

In the second pattern illustrated in FIG. 9, a data signal of one kind of QoS class is mapped to each of the component carriers constituting a communication channel as described above. In this case, the user equipment 100 may use, for example, reference values varying from one component carrier to another depending on the priority of corresponding QoS class as reference values for comparison to the quality levels. The user equipment 100 may determine to start measurement when the representative value of the quality levels in a component carrier corresponding to a QoS class with a high priority becomes lower than a reference value, for example, other than the criterion of the first pattern.

(In Third Pattern)

In the third pattern illustrated in FIGS. 10A to 10D, there is a possibility that a data signal of a plurality of kinds of QoS classes is mapped to one component carrier as described above. In this case, the user equipment 100 may use, for example, reference values varying depending on whether the component carrier has a resource block corresponding to a QoS class with high priority or not as reference values for comparison to the quality levels. The user equipment 100 may determine to start measurement when the quality level of any one resource block corresponding to a QoS class with a high priority becomes lower than a reference value, for example, other than the criterion of the first pattern. Alternatively, the user equipment 100 may determine to start measurement when the representative value of the quality levels in a plurality of component carriers for a QoS class with a high priority (the minimum value, the average value or the like of the quality level of each resource block) becomes lower than a reference value, for example.

As described above, by determining the necessity of measurement by using a criterion which varies depending on the pattern of mapping, it is possible to reduce a cost necessary for measurement as well as maintaining the appropriate service quality in a radio communication involving the carrier aggregation. A flexible control of the procedure according to QoS requirements is also enabled by using a criterion which varies from one component carrier to another.

(4-5. Measurement Report)

Then, after acquiring synchronization with a downlink channel of a peripherally base station by cell search, the user equipment 100 performs measurement by using a reference signal contained in the downlink channel (step S124). The user equipment 100 then sends a measurement report to the base station 200 according to a result of the measurement (step S126). After that, the base station 200 determines whether a handover should be performed or not based on the contents of the measurement report. Further, the user equipment 100 may determine whether a measurement report should be sent to the base station 200 or not according to a result of the measurement. The determination as to whether a measurement report should be sent or not can be made according to a criterion which varies depending on a mapping between each of the component carriers and the QoS class of each data signal. The details of the determination about the sending of a measurement report which correspond to each pattern of mapping are described hereinbelow.

(In First Pattern)

In the first pattern illustrated in FIG. 8, a data signal of one kind of QoS class only is mapped to all of the component carriers constituting a communication channel as described above. In this case, the user equipment 100 may determine to send a measurement report when the channel quality of another base station in the periphery is higher than the channel quality of the base station 200 by a specific threshold or greater for any one component carrier, for example. Any one component carrier may be a component carrier whose channel quality with the base station 200a (i.e. the serving base station) is the highest, for example. Alternatively, any one component carrier may be a component carrier to which the most resource blocks are allocated. Furthermore, threshold values varying from one component carrier to another may be set. In this case, measurement report may be sent when the difference in channel quality exceeds respective corresponding threshold value for any one or all of the component carriers. For example, threshold values varying depending on the number of resource blocks allocated to each component carrier may be set.

(In Second Pattern)

In the second pattern illustrated in FIG. 9, a data signal of one kind of QoS class is mapped to each of the component carriers constituting a communication channel as described above. In this case, the user equipment 100 may determine to send a measurement report when the channel quality of another base station in the periphery is higher than the channel quality of the base station 200 by a specific threshold or greater for a component carrier corresponding to a QoS class with a high priority, for example, other than the criterion of the first pattern. Furthermore, threshold values varying from one component carrier to another may be set. In this case, measurement report may be sent when the difference in channel quality exceeds respective corresponding threshold value for any one or all of the component carriers. For example, threshold values varying depending on the priority of corresponding QoS class may be set.

(In Third Pattern)

In the third pattern illustrated in FIGS. 10A to 10D, there is a possibility that a data signal of a plurality of kinds of QoS classes is mapped to one component carrier as described above. In this case, the user equipment 100 may determine to send a measurement report when the channel quality of another base station in the periphery is higher than the channel quality of the base station 200 by a specific threshold or greater for any one component carrier having a resource block corresponding to a QoS class with a high priority, for example, other than the criterion of the first pattern. Furthermore, threshold values varying from one component carrier to another may be set. In this case, measurement report may be sent when the difference in channel quality exceeds respective corresponding threshold value for any one or all of the component carriers. For example, a lower threshold value may be set for a component carrier having a resource block corresponding to a QoS class with high priority, and a higher threshold value may be set for the other component carriers.

As described above, by determining whether a measurement report should be sent or not by using a criterion which varies depending on the pattern of mapping, it is possible to suppress consumption of the communication resource by the sending of a measurement report as well as maintaining the appropriate service quality in a radio communication involving the carrier aggregation. Further, in the case of not sending a measurement report, it is possible to omit the measurement report creation process. A flexible control of the procedure according to QoS requirements is also enabled by using a criterion which varies from one component carrier to another.

(5. Summary)

The radio communication system 1 according to one embodiment of the present invention is described above with reference to FIGS. 3 to 11. According to the embodiment, each data signal transmitted on a plurality of component carriers that constitute one communication channel by the carrier aggregation technology is classified into any QoS class depending on a QoS requirement. Then, the execution of measurement and the sending of a measurement report are controlled in the user equipment 100 according to a procedure which varies depending on a mapping between each of the component carriers and the QoS class of each data signal. It is thereby possible to efficiently execute processing from the start of measurement to the sending of a measurement report without degrading the service quality as much as possible in a radio communication involving the carrier aggregation.

For example, as described above, by controlling determination as to whether a measurement report should be sent or not according to a procedure which varies depending on mapping described above, consumption of the communication resource for the sending of the measurement report is suppressed. Further, a cost necessary for creation of the measurement report can be reduced. Furthermore, by determining the necessity of measurement according to a criterion which varies depending on mapping described above, it is possible to reduce a cost necessary for measurement as well as maintaining the appropriate service quality. In addition, by dynamically calculating the value of the quality level to be included into a channel quality report according to mapping described above, it is possible to reduce the amount of the communication resource necessary for the channel quality report as well as maintaining the effectiveness of the channel quality report.

It should be noted that a series of processing according to the embodiment described in this specification may be implemented on either hardware or software. In the case of executing a series or part of processing on software, a program constituting the software is stored in a storage medium such as a hard disk or semiconductor memory, read into random access memory (RAM) at the time of execution and then executed by a processing device such as a CPU or a DSP.

Although preferred embodiments of the present invention are described in detail above with reference to the appended drawings, the present invention is not limited thereto. It should be understood by those skilled in the art that various modifications, combinations, sub-combinations and alterations may occur depending on design requirements and other factors insofar as they are within the scope of the appended claims or the equivalents thereof.

The present application contains subject matters related to that disclosed in Japanese Priority Patent Application JP 2009-263004 filed in the Japan Patent Office on Nov. 18, 2009, and Japanese Priority Patent Application JP 2010-219635, the entire content of both of which are hereby incorporated by reference.

REFERENCE SIGNS LIST

1 RADIO COMMUNICATION SYSTEM
100 USER EQUIPMENT
110 RADIO COMMUNICATION UNIT
160 CONTROLLER
170 MEASUREMENT UNIT
200 BASE STATION
210 RADIO COMMUNICATION UNIT
260 STORAGE UNIT
270 CONTROLLER
280 QoS MANAGER

The invention claimed is:

1. An information processing apparatus for communicating with another information processing apparatus, comprising:
   circuitry configured to:
   receive quality information including a quality of service requirement for each portion of data of a data set to be transmitted;
   select a mapping pattern to allocate each said portion of data of the data set on respective component carriers based on the quality of service requirement for each said portion of data of the data set; and
   notify said another information processing apparatus of allocation information that specifies how each said portion of data of the data set is to be allocated on the respective component carriers.

2. The apparatus of claim 1, wherein said circuitry is configured to allocate each said portion of data of the data set differently according to the quality information associated with a data classification for each said portion of data of the data set.

3. The apparatus of claim 1, wherein said circuitry is configured to mix different portions of data from the data set with different quality of service criteria on a common communication channel using carrier aggregation of said respective component carriers.

4. The apparatus of claim 1, wherein said mapping pattern of respective component carriers to each said portion of data of the data set based on the quality of service requirement for each said portion of data of the data set by said circuitry enables dynamic control at said another information processing apparatus from a time of starting channel quality measurement to providing a measurement report to said information processing apparatus.

5. The apparatus of claim 4, wherein
said circuitry is configured to determine whether to perform a handover for said another information processing apparatus based on whether the measurement report indicates that a better channel quality is available to said another information processing apparatus from a peripheral information processing apparatus, said better channel quality being better with respect to a predetermined threshold.

6. The apparatus of claim 5, wherein the predetermined threshold is varied for said respective component carriers.

7. The apparatus of claim 1, wherein:
said circuitry is configured to select said mapping pattern for allocating each said portion of data of the data set on the respective component carriers based on one of a variation of channel quality among the respective component carriers and resource availability of the respective component carriers.

8. The apparatus of claim 7, wherein:
said circuitry is configured to determine the variation of channel quality among the respective component carriers via a preceding channel quality report provided by said another information processing apparatus.

9. The apparatus of claim 7, wherein:
said circuitry is configured to determine the variation of channel quality among the respective component carriers by requesting an auxiliary channel quality report from said another information processing apparatus.

10. The apparatus of claim 1, wherein said circuitry is configured to select said mapping pattern based on a first channel quality report, including channel quality of the respective component carriers, said first channel quality report being received by said circuitry prior to said circuitry selecting said mapping pattern.

11. The apparatus of claim 10,
wherein said circuitry is configured to receive a subsequent channel quality report, including the channel quality of the respective component carriers, and
wherein contents of said subsequent channel quality report vary from contents of the first channel quality report based on said selected mapping pattern.

12. The apparatus of claim 1, wherein said circuitry is configured to
receive a first channel quality report, including channel quality of the respective component carriers, and
select said mapping pattern based on the channel quality of the respective component carriers included in the first channel quality report.

13. The apparatus of claim 12, wherein said circuitry is configured to receive a measurement report, from said another information processing apparatus, based on whether the channel quality of the respective component carriers satisfy a predetermined threshold.

14. The apparatus of claim 1, wherein said circuitry is configured to receive a measurement report, from said another information processing apparatus, based on a criterion which varies based on the selected mapping pattern.

15. A method for controlling communications between an information processing apparatus and another information processing apparatus, comprising:
receiving quality information including a quality of service requirement for each portion of data of a data set to be transmitted;
selecting, using a processor, a mapping pattern to allocate each said portion of data of the data set on respective component carriers based on the quality of service requirement for each said portion of data of the data set; and
notifying said another information processing apparatus of allocation information that specifies how each said portion of data of the data set is to be allocated on respective component carriers.

* * * * *